(12) United States Patent
Amla et al.

(10) Patent No.: US 11,820,875 B2
(45) Date of Patent: *Nov. 21, 2023

(54) POLYMER COMPOSITIONS AND THEIR USES

(71) Applicant: Thintronics, Inc., Berkeley, CA (US)

(72) Inventors: Tarun Amla, Berkeley, CA (US); Stefan J. Pastine, Berkeley, CA (US)

(73) Assignee: Thintronics, Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,921

(22) Filed: May 12, 2022

(65) Prior Publication Data

US 2023/0099234 A1 Mar. 30, 2023

Related U.S. Application Data

(63) Continuation of application No. 17/153,190, filed on Jan. 20, 2021, now Pat. No. 11,359,062.

(51) Int. Cl.
*C08J 5/18* (2006.01)
*C08F 283/10* (2006.01)
*C08G 73/02* (2006.01)

(52) U.S. Cl.
CPC .............. *C08J 5/18* (2013.01); *C08F 283/10* (2013.01); *C08G 73/024* (2013.01); *C08G 73/0253* (2013.01); *C08J 2363/00* (2013.01)

(58) Field of Classification Search
None
See application file for complete search history.

(56) References Cited

U.S. PATENT DOCUMENTS

| | | | | |
|---|---|---|---|---|
| 5,164,472 | A * | 11/1992 | White | C08G 59/621 528/97 |
| 5,275,853 | A * | 1/1994 | Silvis | C08G 59/50 428/35.4 |
| 5,401,814 | A * | 3/1995 | Schomaker | C08G 59/621 525/523 |
| 5,464,924 | A * | 11/1995 | Silvis | C08G 59/10 528/102 |
| 5,709,957 | A | 1/1998 | Chiang et al. | |
| 5,834,078 | A | 11/1998 | Cavitt et al. | |
| 5,965,245 | A | 10/1999 | Okano et al. | |
| 6,165,617 | A | 12/2000 | Satoh et al. | |
| 6,346,164 | B1 | 2/2002 | Nakamura et al. | |
| 6,440,567 | B1 | 8/2002 | Choate et al. | |
| 6,805,958 | B2 | 10/2004 | Nakamura et al. | |
| 6,890,635 | B2 | 5/2005 | Lin et al. | |
| 8,058,363 | B2 | 11/2011 | Jian et al. | |
| 8,581,107 | B2 | 11/2013 | Hsu | |
| 8,748,513 | B2 | 6/2014 | Chen | |
| 9,265,160 | B2 | 2/2016 | Paul et al. | |
| 10,233,365 | B2 | 3/2019 | Scholz | |
| 2001/0018986 | A1 | 9/2001 | Nagai et al. | |
| 2003/0148107 | A1 | 8/2003 | Suzuki et al. | |
| 2003/0194563 | A1 * | 10/2003 | Shi | C09D 163/00 428/413 |
| 2004/0084304 | A1 | 5/2004 | Thompson | |
| 2004/0099367 | A1 | 5/2004 | Nakamura et al. | |
| 2006/0065992 | A1 * | 3/2006 | Hutchinson | B29C 48/09 264/45.1 |
| 2006/0292323 | A1 | 12/2006 | Hutchinson et al. | |
| 2008/0014429 | A1 | 1/2008 | Su et al. | |
| 2008/0107863 | A1 | 5/2008 | Ikeda et al. | |
| 2009/0298974 | A1 | 12/2009 | Chmielewski et al. | |
| 2009/0321116 | A1 | 12/2009 | Arifuku et al. | |
| 2010/0314160 | A1 | 12/2010 | Chang et al. | |
| 2013/0303659 | A1 | 11/2013 | Wilson et al. | |
| 2014/0102623 | A1 | 4/2014 | Kawai et al. | |
| 2015/0284618 | A1 | 10/2015 | Esseghir et al. | |
| 2016/0075839 | A1 | 3/2016 | Bedner et al. | |
| 2016/0229965 | A1 | 8/2016 | Chmielewski et al. | |
| 2016/0255717 | A1 | 9/2016 | Furutani et al. | |
| 2016/0258862 | A1 | 9/2016 | Shin et al. | |
| 2017/0064841 | A1 | 3/2017 | Han | |
| 2018/0037703 | A1 | 2/2018 | Richardson et al. | |
| 2020/0270413 | A1 | 8/2020 | Koes et al. | |
| 2020/0344880 | A1 | 10/2020 | Uno et al. | |
| 2020/0369855 | A1 | 11/2020 | Koes et al. | |

FOREIGN PATENT DOCUMENTS

| | | | | |
|---|---|---|---|---|
| WO | 03051994 | A2 | 6/2003 | |
| WO | WO-03051994 | A2 * | 6/2003 | ............ C08L 77/00 |
| WO | 20162010761 | A1 | 12/2016 | |

OTHER PUBLICATIONS

Epoxy Resins, Ullmann's Encyclopedia of Industrial Chemistry, p. 170, 2012. (Year: 2012).*
Brennan et al., "Poly(hydroxy amide ethers): new high-barrier thermoplastics," Macromolecules, 1996, 29: 3707-3716.
Dielectric Constant of Plastic Materials (Year: 2021).
English Translation JP3579800B2 (Year: 1994).
International Search Report and Written Opinion for International Application No. PCT/US2021/014088 dated Jul. 1, 2021.
Low Dielectric Poly (imide siloxane) films, Published Dec. 16, 2019 (Year: 2019).
Pubmed Compound Record for CID 22084909, '2-(Dimethylamino)-1-[1-[2-(dimethylamino)-1-hydroxyethoxy]ethoxy]ethanol', U.S. National Library of Medicine, 2007, 1-7 (https//pubchem_ncbi.nlm.nih.gov/compound/22084909).

* cited by examiner

*Primary Examiner* — Christopher M Rodd
(74) *Attorney, Agent, or Firm* — Element IP, PLC

(57) ABSTRACT

Provided herein is a polymer composition comprising a polyhydroxyamino ether (e.g., a crosslinked polyhydroxyamino ether) and printed circuit boards comprising the same.

24 Claims, 4 Drawing Sheets

POLYMER COMPOSITIONS AND THEIR USES

CROSS REFERENCE TO RELATED APPLICATIONS

This application is a continuation of U.S. patent application Ser. No. 17/153,190, filed on Jan. 20, 2021, the contents of which are incorporated herein by reference in their entirety and for all purposes.

BACKGROUND

Thermoset polymeric materials irreversibly change into insoluble polymer networks upon curing. Thermoset polymers with improved processability would facilitate the control, fabrication, and manufacture of thermoset polymer materials. Such materials may be used in a variety of applications, such as insulating layers and laminates for printed circuit boards (PCBs), composites (e.g. reinforced plastics) for structural or non-structural applications (e.g., automotive, aerospace, or decorative applications), and adhesives (e.g., used in the manufacture of electrical goods or for bonding).

High Density interconnect (HDI) boards are not suitable for mechanical drilling processes and require laser drilling or other means for creating holes. The holes characterized as microvias are generally classified as holes which are less than 150 micrometers in diameter. Currently, a combination of materials are used for providing the bonding sheet or the dielectric layer for such boards. The HDI boards are different in the sense that they use build up technology in which a board is sequentially built-up layer-by-layer as opposed to conventional multilayer processes which require significantly reduced number of process steps. Currently a combination of several different materials is used ranging from Laser Drillable Prepregs, Conventional Prepregs using standard thermosets, and to a small extent, thermosetting epoxy films (e.g., as provided by Ajinomoto Corporation) or Resin Coated Copper (RCC) foil.

Most of the dielectric materials that are used to make printed circuit boards incorporate reinforcement into the resin system. Reinforcement usually takes the form of woven fiberglass. As the composite formed with the woven glass is heterogeneous and anisotropic, a number of properties are affected such as the coefficients of thermal expansion the Young's modulus in the x, y and z direction and mechanical processes become very difficult such as drilling, either mechanical or laser, debris removal from holes, excessive heat buildup, lower productivity and lower reliability. Additionally, the glass fabric thickness is a barrier towards achieving 25 micrometers and lower in dielectric layer thickness for printed circuit board (PCB) materials, thereby hindering the process of miniaturization and reducing density Thermoset Film based systems generally demonstrate poor thermal properties with high expansion, brittleness and fabrication related issues and variable dielectric spacing. The lack of availability of thin fiberglass combined with its relativity high dielectric constant is a particular issue for continued PCB miniaturization particularly as it relates to subtractive etching techniques.

SUMMARY

Provided herein, in part, is a polymer composition (e.g., a thermosetting polymer composition) comprising a polyhydroxy amino ether (PHAE) and a crosslinking agent, and optionally a filler, optionally flame retardant and/or other optional modifiers. In some embodiments, polymer composition is formed from a crosslinking reaction of a thermoplastic material and a crosslinking agent (e.g., an hydroxyl reactive compound or resin). In some embodiments, the crosslink is a functionalized hydroxyl group (i.e., a functionalized hydroxyl group of the polyhydroxy amino ether.

In an embodiment, provided herein is a crosslinked polymer composition (i.e., cured polymer composition) comprising a crosslinked polyhydroxyamino ether (PHAE). In some embodiments, the composition comprises a filler. In some embodiments, the composition comprises a flame retardant. In some embodiments, the composition comprises an auxiliary modifier.

In an embodiment, described herein is a layer, sheet, or film comprising a crosslinked polyhydroxyamino ether.

In an embodiment, described herein is a film comprising a crosslinked polyhydroxyamino ether, wherein the crosslinked polyhydroxyamino ether comprises a reaction product of: (a) a polyhydroxyamino ether comprising at least one repeat unit of Formula (I):

Formula (I)

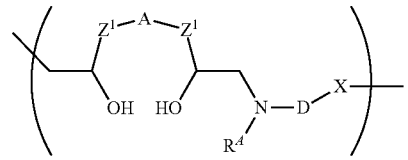

wherein: A is substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, -($A^1$-$A^2$-$A^3$-O-$A^4$-O)$_m$-$A^1$-$A^2$-$A^3$-, or -$A^1$-$A^2$-$A^3$-; each occurrence of $A^1$, $A^3$, and $A^4$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; each occurrence of $A^2$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, or —$SO_2$—; D is absent, substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; X is absent or $NR^B$; m is 1 to 1,000 (e.g., 1 to 2, 1 to 3, 1 to 4, 1 to 5, 1 to 6, 1 to 7, 1 to 8, 1 to 9, 1 to 10, 1 to 20, 1 to 30, 1 to 40, 1 to 50, 1 to 100, or 1 to 500); each of $Z^1$ and $Z^2$ is independently absent, O, $NR^C$, or S; and each of $R^A$, $R^B$, and $R^C$ is independently substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted cycloalkylene (e.g., substituted or unsubstituted $C_{3-10}$ cycloalkyl), substituted or unsubstituted heterocyclylene (e.g., substituted or unsubstituted $C_{3-10}$ heterocyclyl), or substituted or unsubstituted aryl, or substituted or unsubstituted heteroaryl; and (b) a crosslinking agent, provided that when X is $NR^B$, D is not absent.

In an embodiment, also provided herein is a blend or admixture comprising a polyhydroxy amino ether (e.g., a polyhydroxy amino ether described herein) and a crosslinking agent. In some embodiments, the crosslinking agent content of the blend or admixture is about 2 parts per hundred (PHr) to about 200 PHr relative to the PHAE. In some embodiments, the crosslinking agent content of the composition is about 5 PHr to about 120 PHr (e.g., about 10 PHr to about 80 PHr, about 20 PHr to about 60 PHr), relative to the parts of the PHAE polymer content of the composition. In some embodiments, the crosslinking agent content of the blend or admixture is about 2 parts per hundred (PHr) to about 200 PHr relative to the PHAE for at least 5 hours after being mixed. In some embodiments, the crosslinking agent content of the composition is about 5 PHr to about 120 PHr (e.g., about 10 PHr to about 80 PHr, about 20 PHr to about 60 PHr), relative to the parts of the PHAE polymer content of the composition, for at least 5 hours after being mixed. In some embodiments, the PHAE and crosslinking agent in present in a weight ratio of about 99.99:0.01 to about 90:10 PHAE:crosslinking agent for at least 5 hours after being mixed. In some embodiments, the PHAE and crosslinking agent is present in a weight ratio of 99:1 to about 98:2 PHAE:crosslinking agent for at least 5 hours after being mixed.

In some embodiments, the composition can be dispersed in a solvent to provide a varnish. In some embodiments, the varnish solvent is dimethylformamide or a mixture of methyl ethyl ketone and dimethylformamide. In some embodiments, the vanish composition can be casted on to a substrate to provide the composition in the form as a thin film. In some embodiments, the varnish composition is stable for days (e.g., before the varnish gels due to the crosslinking of the PHAE and the crosslinking agent). In some embodiments, the varnish composition is stable for weeks before gelling occurs. In some embodiments, the varnish composition is stable for months before gelling occurs. In some embodiments the varnish composition is casted on to a carrier film. In some embodiments, the carrier film is polyethylene terephthalate (PET) or PET that has been treated to further facilitate the release of the polymer composition. In some embodiments, the varnish composition is casted on to copper foil to provide a copper foil that is coated with a dielectric material.

In an embodiment, provided herein is a printed circuit board comprising a composition described herein. In an embodiment, provided herein is a printed circuit board comprising a crosslinked polyhydroxy amino ether. In an embodiment, provided herein is a printed circuit board comprising a dielectric layer, wherein the dielectric layer comprises a crosslinked polyhydroxyamino ether. In some embodiments, a printed circuit board is a high-density interconnect printed circuit board.

In an embodiment, provided herein is a method of making a sheet or film comprising a polymer composition comprising at least a polyhydroxy amino ether (PHAE) polymer and a crosslink agent or at least a crosslinked PHAE, the method comprising a solvent casting process. In some embodiments, the polyhydroxy amino ether (PHAE) polymer and a crosslink agent or at least a crosslinked PHAE is solvent casted on a substrate. In some embodiments, the varnish composition used in the process is coated on a carrier film by passing through a slot die.

In an embodiment, provided herein is a method of making or assembling a printed circuit board as described herein, comprising incorporation of a polymer sheet or film as described herein.

DETAILED DESCRIPTION

Figure 1:
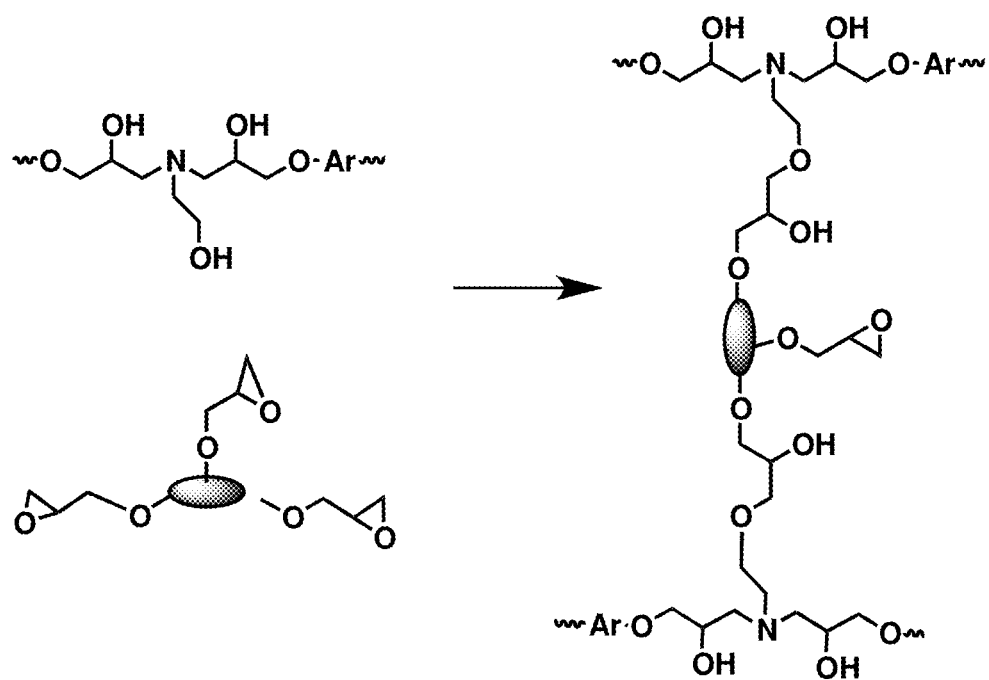
FIG. 1 shows a proposed mechanism for the conversion of PHAE admixture compositions into a crosslinked PHAE composition with an epoxide crosslinker.

This application refers to various issued patents, published patent applications, journal articles, and other publications, all of which are incorporated herein by reference. If there is a conflict between any of the incorporated references and the instant specification, the specification shall control.

Provided herein, in part, are polymer compositions (e.g., a thermosetting polymer composition, or a crosslinked polymer composition) comprising a polyhydroxy amino ether (PHAE) and a crosslinking agent or polymer compositions comprising a crosslinked polyhydroxy ether. The crosslink results from reaction of the polyhydroxy amino ether and a crosslinking agent. For example, the crosslink results from reaction of a pendant functional group (e.g., hydroxy group) along the PHAE polymer chain. It is one object of the present disclosure to provide novel PHAE compositions, which are suitable for use as insulating layers of a multilayered printed circuit boards.

Thermosetting Polymer Compositions & Crosslinked Thermoplastic Compositions

A crosslinked polymer composition described herein (e.g., a crosslinked polyhydroxyamino ether) can be formed by the curing of a thermoplastic composition described herein (e.g., a poly hydroxyamino ether as described herein) with a crosslinking agent described herein (e.g., an compound with two or more epoxide groups, e.g., an organophosphorous agent as described herein). In some embodiments, the curing occurs from 5, 10, 15, 30, 45, 60 minutes to 1, 2, 4, 6, 8, 10, 12 hours or more depending on the temperature and formulation. In some embodiments the curing temperature is from about 100° C. to about 220° C. In some embodiments, the crosslinked polymer composition is formed upon standing at ambient temperature (e.g., 20° C.). In some embodiments, films or sheets of the thermoplastic polymer composition are used as the insulative bonding layer in a printed circuit board, wherein the polymer composition is converted into a crosslinked polymer composition during the PCB lamination process. In some embodiments, films or sheets of the crosslinked polymer composition are used as the insulative bonding layer in a printed circuit board, wherein the crosslinked polymer composition will still bond even though it is already crosslinked prior to he PCB lamination process and has no-flow.

In some embodiments, the crosslinked composition is produced from reaction of a polyhydroxyamino ether and an organophosphate agent, an anhydride, an epoxide, an isocyanate, a maleimide or a combination thereof, with the PHAE. In some embodiments, the crosslink is derived from reaction of an organophosphate agent. In some embodiments, the crosslink is derived from the reaction of epoxide containing agent (e.g. epoxy resin). In some embodiments, the crosslinking agent content of the composition is about 2 parts per hundred (PHr) to about 200 PHr relative to the PHAE. In some embodiments, the crosslinking agent content of the composition is about 5 PHr to about 120 PHr (e.g., about 10 PHr to about 80 PHr, about 20 PHr to about 60 PHr), relative to the parts of the PHAE polymer content of the composition.

Exemplary methods for preparing the polymer composition described herein include: 1) dissolving and/or dispersing the components (e.g., PHAE, crosslinker, filler, flame retardant) in an solvent to create a varnish; 2) coating the varnish on a substrate (e.g. copper foil) or carrier film (e.g. PET) via a casting process (e.g. slot die) where by the thickness of the film can be controlled; and 3) evaporation/removal of the solvent via drying oven to yield a film of the polymer composition on a substrate or carrier film. In some embodiments, the polymer composition or has a retained solvent percentage from about 0% to about 2%. In some embodiments, the polymer composition is a thermoplastic polymer composition after the film casting and drying process. In some embodiments, the polymer composition is a crosslinked thermoplastic composition after the film casting and drying process. In some embodiments, the film of the polymer composition is tack-free and/or dry to the touch. In some embodiments, the film of the polymer composition can be peeled off the carrier film. In some embodiment, the film of the polymer composition can be transferred to a substrate via passing through, e.g., a hot roll laminator, and then the carrier film may be peeled off, whilst the PHAE film remains attached to the substrate.

The polymer composition (e.g., a thermosetting polymer composition or a crosslinked thermoplastic composition) optionally comprises a filler. In some embodiments, the amount of filler is about 0, 1, 5, 10, 15, 20, 25, 30, 35, 40, 45, 50, 55, 60, 65, 70, 75, 80% w/w of the composition.

In some embodiments, the $T_g$ is about 30, 40, 50, 60 70, 80, 90, 100, 110, 120, 130, 140, 150, 160, or 170° C. in the cured thermoset composition. In some embodiments, the $T_g$ is about 120, 130, 140, or 150° C. in the cured thermoset composition. In some embodiments, the $T_g$ is between about 70 to about 100° C. In some embodiments, the $T_g$ is between about 30 to about 70° C.

In some embodiments, the glass transition temperature ($T_g$) of the composition is about 30, 40, 50, 60, 70, 80, 90, 100, 110, 120, 130, 140, 150, 160, 170° C., or 180° C. In some embodiments, the $T_g$ of the composition is about 120, 130, 140, 150, or 160° C. In some embodiments, the $T_g$ of the composition is about 50, 60, 70, 80, 90, or about 100° C. In some embodiments the $T_g$ of the composition is less than 100° C. and greater than 25° C. In some embodiments, the coefficient of thermal expansion of the composition is about 20, 30, 40, 50, or 60 ppm below the $T_g$ of the composition. In some embodiments, the dielectric constant of the composition is about 2.8, 2.9, 3.0, 3.1, 3.2, 3.3, 3.4, 3.5, 3.6, 3.7, 3.8, 3.9, or 4.0 or between 5.0 and 10.5. In some embodiments, the Young's modulus of the composition is about 1, 1.5, 2, 3, 4, 5, 6, 7, 8, 9, 10, or 11 GPa.

In some embodiments, the coefficient of thermal expansion is about 20, 30, 40, 50, 60 ppm below the $T_g$ in the cured thermoset composition. In some embodiments, the coefficient of thermal expansion is about 100, 110, 120, 130, 140, 150, 160, 170, 180, 190, 200, ppm above the $T_g$ in the cured thermoset composition.

In some embodiments, the dielectric constant of the cured thermoset composition is about 2.8, 2.9 3.0, 3.1, 3.2, 3.3, 3.4, 3.5, 3.6, 3.7, 3.8, 3.9, or 4.0. In some embodiments, the dielectric constant is between 5.5 and 10.5.

In some embodiments, the Young's modulus (also referred to as tensile or elastic modulus) of the cured thermoset composition is about 1, 1.5, 2, 3, 4, 5, 6, 7, 8, 9, 10, 11 GPa.

In some embodiments, for example for electronics applications, the preferred film thickness is from about 0.25 Mil to about 2 Mil. In some embodiments, for example for electronic applications, the preferred sheet thickness is about 4 Mil to about 125 Mils. In some embodiments, the desired thickness of an insulating layer in printed circuit board can be achieved by stacking the sheets or films prior the lamination process. In some embodiments, films and/or sheets of the thermosetting polymer compositions described herein can be used to replace conventional thermosetting compositions such as fiberglass prepregs. In some embodiments, the thermosetting polymer compositions described herein are used to fabricate copper clad laminates without the use of woven fiberglass. Specific, but non-limiting advantages of prepregs formed with thermosetting polymer compositions described herein over epoxy/fiberglass prepregs for PCB construction include, e.g., lower dielectric constant, less anisotropy, and the ability to readily fabricate smaller and more reliable micro via. In at least some embodiments, the polymer compositions in various forms may find particular applicability in the formation of printed circuit boards such as for mobile electronics devices, IOT devices, camera modules, autonomous systems, main logic boards and embedded electronics, and servers.

Also provided herein is a blend comprising a thermoplastic polymer composition described herein (e.g., a polyhydroxy amino ether as described herein (e.g., PHAE)), a crosslinking agent described herein (e.g., an epoxy resin as described herein), and optionally property modifiers such as, but not limited to, fillers, flame retardants and other additives. In some embodiments, the blend is bonded and/or crosslinked at elevated temperature (e.g., at 100, 120, 130, 140, 150° C. or more). In some embodiments, the curing time is from about 1 min to 4 hours. In some embodiments, the bonding or curing time is at least 1, 5, 10, 15, 30, 45, 60 minutes; 1, 2, 3, or 4 hours. In some embodiments, the blend is crosslinked during the solvent casting film formation process.

In some embodiments, the ratio of the PHAE to the crosslinking agent (e.g., epoxy resin, malemide, anhydride, organophosphorus, blocked isocyanate, or other hydroxy reactive compound) in the blend is about from about 1:0.001 to about 1:1.2 (e.g., about 1:0.01 to about 1:0.03, or about 1:0.01 to about 1:0.02). In some embodiments, the ratio of the PHAE to the crosslinking agent (e.g., epoxy resin) in the blend is about 1:0.5. In some embodiments, the ratio of the PHAE to the crosslinking agent (e.g., epoxy resin) in the blend is about 1:0.1. In some embodiments, the ratio of the PHAE to the crosslinking agent (e.g., epoxy resin) in the blend is about 1:0.3. In some embodiments, the ratio of the PHAE to the crosslinking agent (e.g., epoxy resin) in the blend is about 1:0.6. In some embodiments, the ratio of the PHAE to the crosslinking agent (e.g., epoxy resin) in the blend is about 1:0.8. In some embodiments, a catalyst is used to increase the rate of reaction between the PHAE and the crosslinker.

In some embodiments, the amount of filler is about 0, 1, 5, 10, 15, 20, 25, 30, 35, 40, 45, 50, 55, 60, 65, 70, 75, 80% w/w of the composition.

Component A—Polyhydroxy Amino Ethers

Compositions described herein, in an embodiment, comprise a polyhydroxyamino ether or reaction product thereof. A polyhydroxyamino ether is also referred to herein as a "PHAE." PHAEs of the present disclosure are the reaction products of (i) a diepoxide (for example, bisphenol A diglycidyl ether) and (ii) a monoamine (e.g., a primary monoamine), a diamine (e.g., a secondary diamine), or combinations of monoamines and diamines. A PHAE used in the compositions described herein may be crosslinked as a result of reaction with a suitable crosslinking agent, or not crosslinked.

In some embodiments, the diepoxide is an epoxy resin. The present disclosure is not limited by the exact nature of the epoxy resin. In some embodiments, the epoxy resin is an aliphatic epoxy resin, a cycloaliphatic epoxy resin, or an aromatic epoxy resin. In some embodiments, the aliphatic epoxy resin is an epoxidized vegetable oil, epoxidized ether, or an epoxidized ester compound. In some embodiments, the diepoxide is a bisphenol epoxy resin. In some embodiments, the cycloaliphatic epoxy resin is 3,4-epoxy cyclohexyl methyl-3',4' epoxycyclohexane carboxylate, 0-(3,4-epoxycyclohexyl)ethyltriethoxysilane, or vinyl cyclohexene diepoxide. In some embodiments, the aromatic epoxy resin is bisphenol A, bisphenol F, glycidyl ethers of phenolic novolacs and bisphenol A novolacs, or glycidyl or diglycidyl derivatives of aromatic amino compounds such as aminophenol and aniline. In some embodiments, the diepoxide is a diepoxide disclosed in US 2020/0317953, which is incorporated herein by reference.

In some embodiments, the diepoxide is a diglycidyl ether (e.g., diglycidyl ethers) derived from Bisphenol A, Bisphenol AP, Bisphenol, AF, Bisphenol B, Bisphenol BP, Bisphenol C, Bisphenol G, Bisphenol M, Bisphenol P, Bisphenol PH, Bisphenol S, Bisphenol E, Bisphenol F, Bisphenol Z, or Bisphenol TMC, resorcinol derivatives, phenol novolac, DCPD novolacs, biphenyl-based resin, or terphenyl-based resin.

In some embodiments, the epoxy resin is selected from the group consisting of a glycidyl ether epoxy resin, a glycidyl ester epoxy resin, a glycidyl amine epoxy resin, an alicyclic epoxy resin, an aliphatic epoxy resin, and a phenolic epoxy resin.

The epoxy crosslinking agent may be liquid, semi-solid, or solid at room temperature. For example, the glycidyl ethers of various phenolic compounds may be used, such as, but not limited to, a glycidyl ethers (e.g., diglycidyl ethers) derived from Bisphenol A, Bisphenol AP, Bisphenol, AF, Bisphenol B, Bisphenol BP, Bisphenol C, Bisphenol G, Bisphenol M, Bisphenol P, Bisphenol PH, Bisphenol S, Bisphenol E, Bisphenol F, Bisphenol Z, or Bisphenol TMC, resorcinol derivatives, phenol novolac, DCPD novolacs, biphenyl-based resin, terphenyl-based resin.

Additionally, non-phenolic epoxy resins may be employed as the cross-linking agent, such as, for example aliphatic and cycloaliphatic epoxy resins, and unsaturated epoxy resins.

In some embodiments, the diepoxide is a bisphenol diglycidyl ether, in which the bisphenol unit (—O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl.

In some embodiments, the diepoxide is a bisphenol A epoxy resin having the structure:

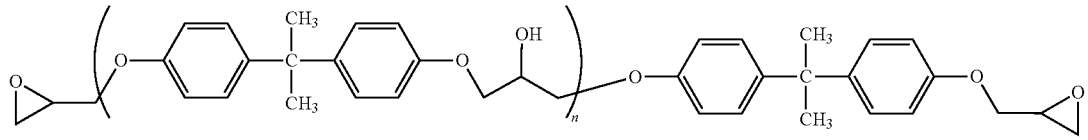

wherein n is 1 to 1,000 (e.g., 1, 1 to 10, 1 to 20, 1 to 30, 1 to 40, 1 to 50, 1 to 60, 1 to 70, 1 to 80, 1 to 90, 1 to 100, 1 to 200, or 1 to 500).

In some embodiments, the diepoxide is a glycidyl ether epoxy resin, glycidyl ester epoxy resin, glycidyl amine epoxy resin, alicyclic epoxy resin, aliphatic epoxy resin, or phenolic epoxy resin. In some embodiments, the diepoxide is an aliphatic diglycidyl ether or an aromatic diglycidyl ether. In some embodiments, the aromatic diglycidyl ether is a bisphenol diepoxide resin. In some embodiments, the bisphenol diepoxide resin is Bisphenol Z, or Bisphenol TMC. In some embodiments, the diepoxide is a biphenyl diepoxide resin. In some embodiments, the biphenyl diepoxide resin has the structure:

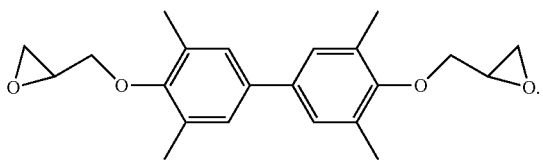 [SMILES: Cc1cc(-c2cc(C)c(OCC3CO3)c(C)c2)cc(C)c1OCC1CO1]

In some embodiments, the PHAE is derived from a polyaddition reaction of an di-epoxide resin (e.g., a resin with only 2 epoxide groups) and a monoamine (e.g., an aliphatic monoamine) or a secondary diamine (e.g., piperazine). In some embodiments, the PHAE is manufactured using a reactive extrusion process. In some embodiments, the PHAE is the reaction product of a combination of monoethanolamine and bisphenol A diglycidyl ether resin. In some embodiments, the polyhydroxy amino ether (PHAE) is the reaction product of a combination of monoethanolamine and phenolic-based diepoxide resins. In some embodiments the diepoxide resin is a lower dissipation factor resin. In some embodiments the diepoxide resin has been esterified to produce a lower dissipation factor. In some embodiments the PHAE is the reaction product of more than one type of diepoxide resin. In some embodiments, the polyhydroxy amino ether (PHAE) is the reaction product of a combination of monoethanolamine and a polyetheramine monoamine and phenolic-based diglycidyl ether resin to obtain a PHAE composition with a lower $T_g$. In some embodiments, the polyhydroxy amino ether (PHAE) is the reaction product of monoethanolamine and a bisphenol A diglycidyl ether resin.

In some embodiments, the monoamine is a compound of Formula (A-1):

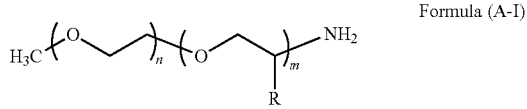

Formula (A-I)

wherein R is hydrogen, alkyl, heteroalkyl, aryl, or heteroaryl, and each m and n is independently an integer from 1 to 10,000 (e.g., 1 to 2,000, or 1 to 1,000).

The molecular nature of the PHAE will influence the mechanical and/or physical, and/or electrical properties of the composition. Thus, the specific resin monomers and amine monomers used in the step-growth polymerization to from the PHAE, will define the end properties of a given PHAE. Thus, important properties such as adhesion, glass transition temperature, dissipation factor, and dielectric constant will be governed by the subunits in the PHAE.

In some embodiments, the repeating unit of a PHAE consists of an alkyl or aromatic ether and a ring or linear amine in the backbone chain, and hydroxyl groups in the pendants from the opening of the epoxy groups. In some embodiments, an exemplary PHAE is made from bisphenol-based diglycidyl ether and a primary monoamine or a secondary diamine. In some embodiments, an exemplary PHAE is made from bis-phenol A diglycidyl ether (BPADGE) and a primary amine or a secondary diamine. The synthesis and characterization of exemplary PHAEs has been described, for example, in U.S. Pat. Nos. 3,317,471; 5,275,853; 5,731,094; 5,464,924; 6,011,111; US 2003/0104218; US2008/0045642; US 2008/0014429; Specialty Monomers and Polymers (ACS Symposium Series 2000; White et al, Chapter 10); and White et al, Adv. Mater. 2000, 12, 23, page 1791-1800, the contents of which are incorporated by reference in their entireties.

In some embodiments, the PHAE comprises at least one repeat unit of Formula (I):

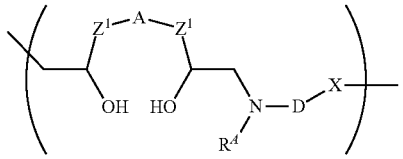

Formula (I)

wherein: A is substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, $-(A^1-A^2-A^3-O-A^4-O)_m-A^1-A^2-A^3-$, or $-A^1-A^2-A^3-$; each occurrence of $A^1$, $A^3$, and $A^4$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; each occurrence of $A^2$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, or $-SO_2-$; D is absent, substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; X is absent or $NR^B$; m is 1 to 1,000 (e.g., 1 to 2, 1 to 3, 1 to 4, 1 to 5, 1 to 6, 1 to 7, 1 to 8, 1 to 9, 1 to 10, 1 to 20, 1 to 30, 1 to 40, 1 to 50, 1 to 100, or 1 to 500); each of $Z^1$ and $Z^2$ is independently absent, O, $NR^C$, or S; and each of $R^A$, $R^B$, and $R^C$ is independently substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted cycloalkylene (e.g., substituted or unsubstituted $C_{3-10}$ cycloalkyl), substituted or unsubstituted heterocyclylene (e.g., substituted or unsubstituted $C_{3-10}$ heterocyclyl), or substituted or unsubstituted aryl, or substituted or unsubstituted heteroaryl; provided that when X is $NR^B$, D is not absent.

In some embodiments, $Z^1$ and $Z^2$ are O. In some embodiments, X and D are absent. In some embodiments, D is substituted or unsubstituted alkylene (e.g., substituted or unsubstituted $C_{1-20}$ alkylene or unsubstituted $C_{1-20}$ alkylene) or substituted or unsubstituted heteroalkylene (e.g., substituted or unsubstituted $C_{1-20}$ heteroalkylene, unsubstituted $C_{1-20}$ heteroalkylene). In some embodiments, when X is absent, D is not absent. In some embodiments, each of $R^A$, $R^B$, and $R^C$ is independently substituted or unsubstituted alkyl (e.g., substituted or unsubstituted $C_{1-20}$ alkyl, $C_{1-20}$ alkyl substituted with one or more independent occurrences of hydroxyl or amino, or unsubstituted $C_{1-20}$ alkyl). In some embodiments, A is substituted or unsubstituted phenylene, substituted or unsubstituted biphenylene. In some embodiments, each $A^1$ and $A^3$ is independently substituted or unsubstituted phenylene. In some embodiments, each A² is independently substituted or unsubstituted alkylene. In some embodiments, each A² is independently SO₂. In some embodiments, each A² is independently SO₂. In some embodiments, each A⁴ is independently substituted or unsubstituted alkyl (e.g., propyl). In some embodiments, each A⁴ is independently alkyl (e.g., propyl) substituted with one or more hydroxyl.

In some embodiments, A is

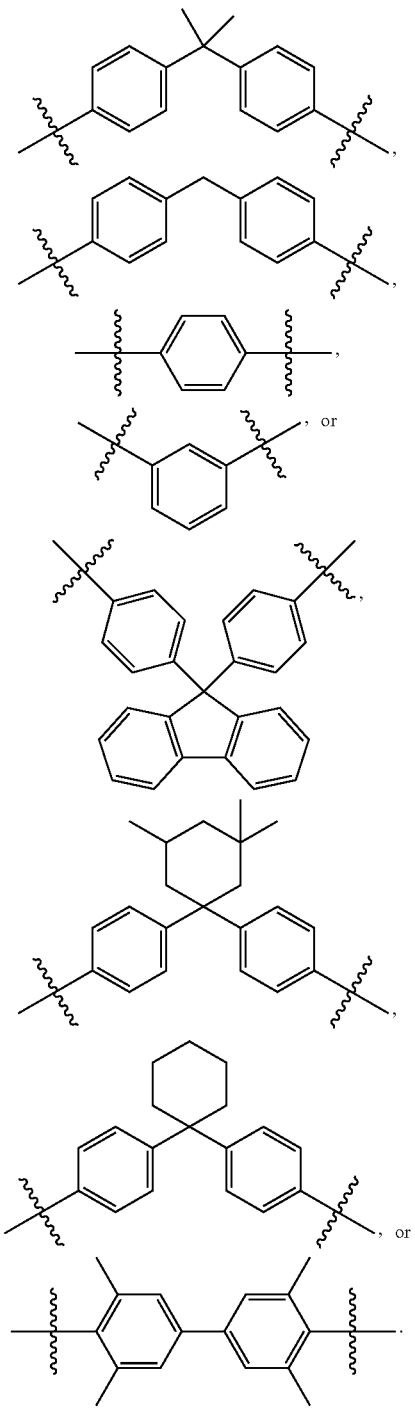

In some embodiments, each of A and D is independently represented by Formula (VI):

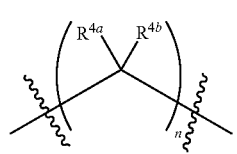

Formula (VI)

wherein each of $R^{4A}$ and $R^{4B}$ is independently hydrogen, alkyl, or aryl, and n is 1 to 100 (e.g., 1 to 5, 1 to 10, 1 to 20, 1 to 50, or 1 to 90).

In some embodiments, each of $R^A$, $R^B$ and $R^C$ is independently represented by the Formula (III-a):

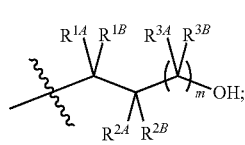

(III-a)

each of $R^{1A}$, $R^{1B}$, $R^{2A}$, $R^{2B}$, $R^{3A}$, and $R^{3B}$ is independently hydrogen, alkyl, or aryl; and m is an integer from 0 to 2.

In some embodiments, $R^A$ is a polyamine selected from methylene polyamines, ethylene polyamines, butylene polyamines, propylene polyamines, pentylene polyamines, hexylene polyamines, and heptylene polyamines. Examples of such polyamines include aliphatic polyamines such as trimethylene diamine, di(trimethylene)triamine, hexamethylene diamine, dihexamethylene triamine, diheptamethylene triamine. In some embodiments, $XR^A$ is derived from a secondary diamine such as piperazine. In some embodiments, $XR^A$ is piperazine.

In some embodiments, $R^A$ is derived from monoamino alcohols such as ethanolamine.

In some embodiments, the PHAE comprises at least one repeat unit of the Formula (II) wherein $R^A$ is an aliphatic polyamine and at least one repeat unit of the Formula (II) wherein $R^A$ is a different aliphatic polyamine. In some embodiments, the PHAE comprises a co-polymer of different Formula (II) repeat units.

In some embodiments, the PHAE comprises at least one repeat unit of Formula (I-A):

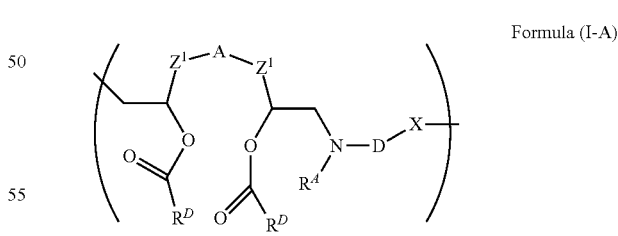

Formula (I-A)

wherein: A is substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, -(A¹-A²-A³-O-A⁴-O)$_m$-A¹-

$A^2-A^3$-, or -$A^1$-$A^2$-$A^3$-; each occurrence of $A^1$, $A^3$, and $A^4$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; each occurrence of $A^2$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, or —$SO_2$—; D is absent, substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; X is absent or $NR^B$; m is 1 to 1,000 (e.g., 1 to 2, 1 to 3, 1 to 4, 1 to 5, 1 to 6, 1 to 7, 1 to 8, 1 to 9, 1 to 10, 1 to 20, 1 to 30, 1 to 40, 1 to 50, 1 to 100, or 1 to 500); each of $Z^1$ and $Z^2$ is independently absent, O, $NR^C$, or S; and each of $R^A$, $R^B$, and $R^C$ is independently substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted cycloalkylene (e.g., substituted or unsubstituted $C_{3-10}$ cycloalkyl), substituted or unsubstituted heterocyclylene (e.g., substituted or unsubstituted $C_{3-10}$ heterocyclyl), or substituted or unsubstituted aryl, or substituted or unsubstituted heteroaryl; provided that when X is $NR^B$, D is not absent.

In some embodiments, $Z^1$ and $Z^2$ are O. In some embodiments, X and D are absent. In some embodiments, D is substituted or unsubstituted alkylene (e.g., substituted or unsubstituted $C_{1-20}$ alkylene or unsubstituted $C_{1-20}$ alkylene) or substituted or unsubstituted heteroalkylene (e.g., substituted or unsubstituted $C_{1-20}$ heteroalkylene, unsubstituted $C_{1-20}$ heteroalkylene). In some embodiments, when X is absent, D is not absent. In some embodiments, each of $R^A$, $R^B$, and $R^C$ is independently substituted or unsubstituted alkyl (e.g., substituted or unsubstituted $C_{1-20}$ alkyl, $C_{1-20}$ alkyl substituted with one or more independent occurrences of hydroxyl or amino, or unsubstituted $C_{1-20}$ alkyl). In some embodiments, A is substituted or unsubstituted phenylene, substituted or unsubstituted biphenylene. In some embodiments, each $A^1$ and $A^3$ is independently substituted or unsubstituted phenylene. In some embodiments, each $A^2$ is independently substituted or unsubstituted alkylene. In some embodiments, each $A^2$ is independently $SO_2$. In some embodiments, each $A^2$ is independently $SO_2$. In some embodiments, each $A^4$ is independently substituted or unsubstituted alkyl (e.g., propyl). In some embodiments, each $A^4$ is independently alkyl (e.g., propyl) substituted with one or more hydroxyl.

In some embodiments, A is

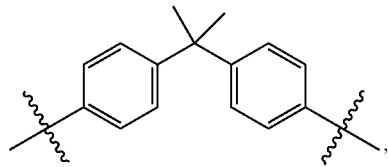

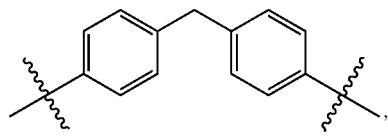

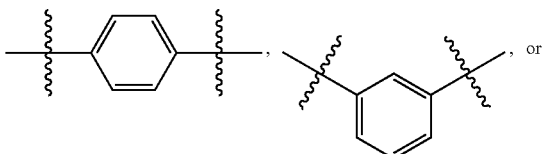

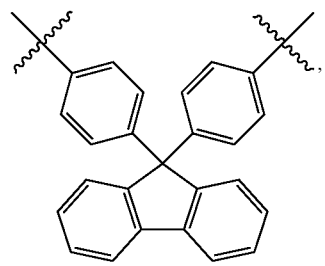

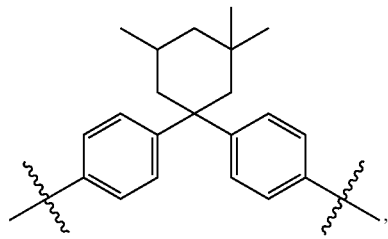

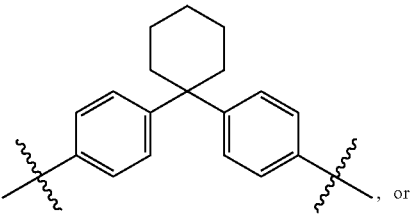

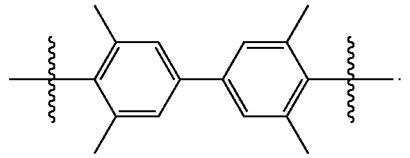

In some embodiments, each of A and D is independently represented by Formula (VI):

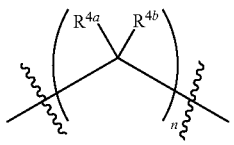

Formula (VI)

wherein each of $R^{4A}$ and $R^{4B}$ is independently hydrogen, alkyl, or aryl, and n is 1 to 100 (e.g., 1 to 5, 1 to 10, 1 to 20, 1 to 50, or 1 to 90).

In some embodiments, each of $R^A$ and $R^C$ is independently represented by the Formula (III-a):

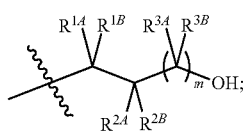

(III-a)

each of $R^{1A}$, $R^{1B}$, $R^{2A}$, $R^{2B}$, $R^{3A}$, and $R^{3B}$ is independently hydrogen, alkyl, or aryl; and m is an integer from 0 to 2.

In some embodiments, $R^A$ is a polyamine selected from methylene polyamines, ethylene polyamines, butylene polyamines, propylene polyamines, pentylene polyamines, hexylene polyamines, and heptylene polyamines. Examples of such polyamines include aliphatic polyamines such as trimethylene diamine, di(trimethylene)triamine, hexamethylene diamine, dihexamethylene triamine, diheptamethylene triamine. In some embodiments, $XR^A$ is derived from a secondary diamine such as piperazine. In some embodiments, $XR^A$ is piperazine.

In some embodiments, $R^A$ is derived from monoamino alcohols such as ethanolamine.

In some embodiments, the PHAE comprises at least one repeat unit of the Formula (II) wherein $R^A$ is an aliphatic polyamine and at least one repeat unit of the Formula (II) wherein $R^A$ is a different aliphatic polyamine. In some embodiments, the PHAE comprises a co-polymer of different Formula (II) repeat units.

In some embodiments, the PHAE comprises at least one repeat unit of Formula (I-B):

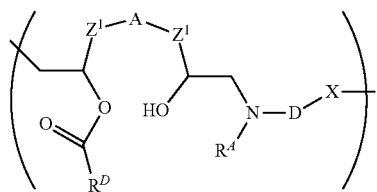

Formula (I-B)

wherein: A is substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, -$(A^1-A^2-A^3-O-A^4-O)_m-A^1-A^2-A^3$-, or -$A^1-A^2-A^3$-; each occurrence of $A^1$, $A^3$, and $A^4$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; each occurrence of $A^2$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, or —$SO_2$—; D is absent, substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; X is absent or $NR^B$; m is 1 to 1,000 (e.g., 1 to 2, 1 to 3, 1 to 4, 1 to 5, 1 to 6, 1 to 7, 1 to 8, 1 to 9, 1 to 10, 1 to 20, 1 to 30, 1 to 40, 1 to 50, 1 to 100, or 1 to 500); each of $Z^1$ and $Z^2$ is independently absent, O, $NR^C$, or S; and each of $R^A$, $R^B$, and $R^C$ is independently substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted cycloalkylene (e.g., substituted or unsubstituted $C_{3-10}$ cycloalkyl), substituted or unsubstituted heterocyclylene (e.g., substituted or unsubstituted $C_{3-10}$ heterocyclyl), or substituted or unsubstituted aryl, or substituted or unsubstituted heteroaryl; provided that when X is $NR^B$, D is not absent.

In some embodiments, $Z^1$ and $Z^2$ are O. In some embodiments, X and D are absent. In some embodiments, D is substituted or unsubstituted alkylene (e.g., substituted or unsubstituted $C_{1-20}$ alkylene or unsubstituted $C_{1-20}$ alkylene) or substituted or unsubstituted heteroalkylene (e.g., substituted or unsubstituted $C_{1-20}$ heteroalkylene, unsubstituted $C_{1-20}$ heteroalkylene). In some embodiments, when X is absent, D is not absent. In some embodiments, each of $R^A$, $R^B$, and $R^C$ is independently substituted or unsubstituted alkyl (e.g., substituted or unsubstituted $C_{1-20}$ alkyl, $C_{1-20}$ alkyl substituted with one or more independent occurrences of hydroxyl or amino, or unsubstituted $C_{1-20}$ alkyl). In some embodiments, A is substituted or unsubstituted phenylene, substituted or unsubstituted biphenylene. In some embodiments, each $A^1$ and $A^3$ is independently substituted or unsubstituted phenylene. In some embodiments, each $A^2$ is independently substituted or unsubstituted alkylene. In some embodiments, each $A^2$ is independently $SO_2$. In some embodiments, each $A^2$ is independently $SO_2$. In some embodiments, each $A^4$ is independently substituted or unsubstituted alkyl (e.g., propyl). In some embodiments, each $A^4$ is independently alkyl (e.g., propyl) substituted with one or more hydroxyl.

In some embodiments, A is

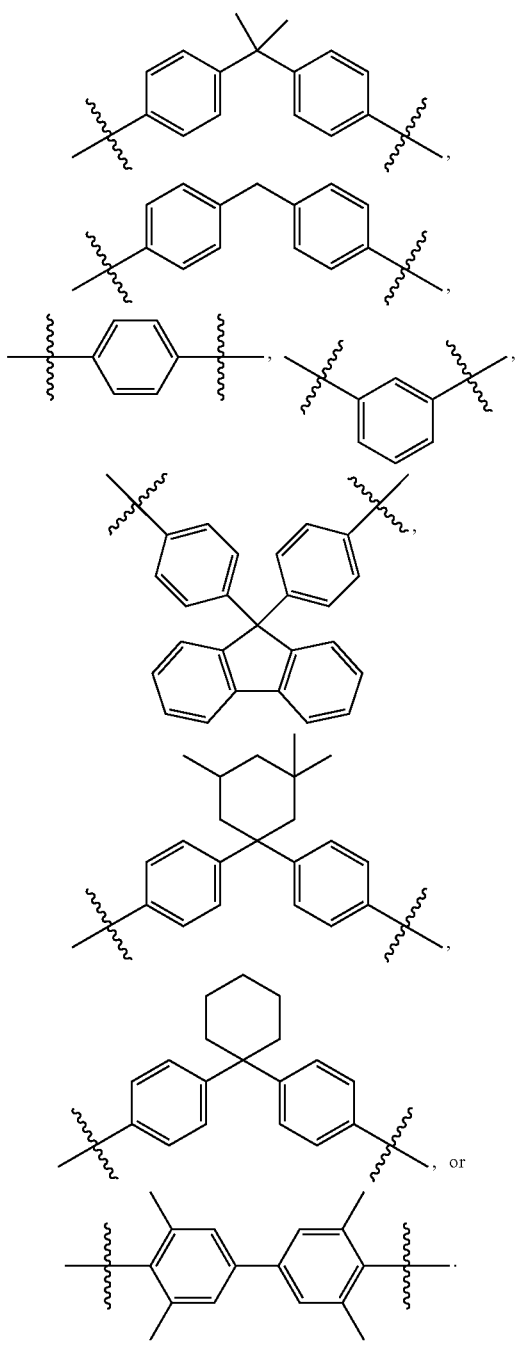

, or

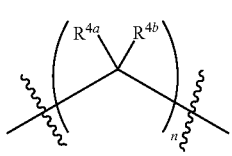

.

In some embodiments, each of A and D is independently represented by Formula (VI):

Formula (VI)

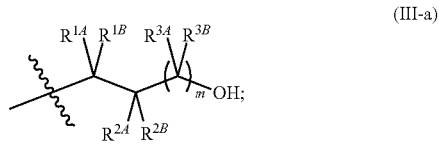

wherein each of $R^{4A}$ and $R^{4B}$ is independently hydrogen, alkyl, or aryl, and n is 1 to 100 (e.g., 1 to 5, 1 to 10, 1 to 20, 1 to 50, or 1 to 90).

In some embodiments, each of $R^A$ and $R^C$ is independently represented by the Formula (III-a):

(III-a)

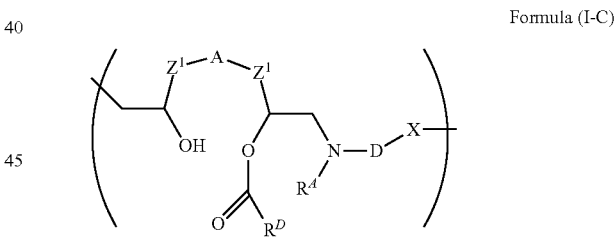

each of $R^{1A}$, $R^{1B}$, $R^{2A}$, $R^{2B}$, $R^{3A}$, and $R^{3B}$ is independently hydrogen, alkyl, or aryl; and m is an integer from 0 to 2.

In some embodiments, $R^A$ is a polyamine selected from methylene polyamines, ethylene polyamines, butylene polyamines, propylene polyamines, pentylene polyamines, hexylene polyamines, and heptylene polyamines. Examples of such polyamines include aliphatic polyamines such as trimethylene diamine, di(trimethylene)triamine, hexamethylene diamine, dihexamethylene triamine, diheptamethylene triamine. In some embodiments, $XR^A$ is derived from a secondary diamine such as piperazine. In some embodiments, $XR^A$ is piperazine.

In some embodiments, $R^A$ is derived from monoamino alcohols such as ethanolamine.

In some embodiments, the PHAE comprises at least one repeat unit of the Formula (II) wherein $R^A$ is an aliphatic polyamine and at least one repeat unit of the Formula (II) wherein $R^A$ is a different aliphatic polyamine. In some embodiments, the PHAE comprises a co-polymer of different Formula (II) repeat units.

In some embodiments, the PHAE comprises at least one repeat unit of Formula (I-C):

Formula (I-C)

$$\left( \begin{array}{c} Z^1-A-Z^1 \\ \vdots \\ OH \quad O \quad N-D \quad X \\ \quad R^A \\ O \quad R^D \end{array} \right)$$

wherein: A is substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, $-(A^1-A^2-A^3-O-A^4-O)_m-A^1-A^2-A^3-$, or $-A^1-A^2-A^3-$; each occurrence of $A^1$, $A^3$, and $A^4$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; each occurrence of $A^2$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, or —$SO_2$—; D is absent, substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; X is absent or $NR^B$; m is 1 to 1,000 (e.g., 1 to 2, 1 to 3, 1 to 4, 1 to 5, 1 to 6, 1 to 7, 1 to 8, 1 to 9, 1 to 10, 1 to 20, 1 to 30, 1 to 40, 1 to 50, 1 to 100, or 1 to 500); each of $Z^1$ and $Z^2$ is independently absent, O, $NR^C$, or S; and each of $R^A$, $R^B$, and $R^C$ is independently substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted cycloalkylene (e.g., substituted or unsubstituted $C_{3-10}$ cycloalkyl), substituted or unsubstituted heterocyclylene (e.g., substituted or unsubstituted $C_{3-10}$ heterocyclyl), or substituted or unsubstituted aryl, or substituted or unsubstituted heteroaryl; provided that when X is $NR^B$, D is not absent.

In some embodiments, $Z^1$ and $Z^2$ are O. In some embodiments, X and D are absent. In some embodiments, D is substituted or unsubstituted alkylene (e.g., substituted or unsubstituted $C_{1-20}$ alkylene or unsubstituted $C_{1-20}$ alkylene) or substituted or unsubstituted heteroalkylene (e.g., substituted or unsubstituted $C_{1-20}$ heteroalkylene, unsubstituted $C_{1-20}$ heteroalkylene). In some embodiments, when X is absent, D is not absent. In some embodiments, each of $R^A$, $R^B$, and $R^C$ is independently substituted or unsubstituted alkyl (e.g., substituted or unsubstituted $C_{1-20}$ alkyl, $C_{1-20}$ alkyl substituted with one or more independent occurrences of hydroxyl or amino, or unsubstituted $C_{1-20}$ alkyl). In some embodiments, A is substituted or unsubstituted phenylene, substituted or unsubstituted biphenylene. In some embodiments, each $A^1$ and $A^3$ is independently substituted or unsubstituted phenylene. In some embodiments, each $A^2$ is independently substituted or unsubstituted alkylene. In some embodiments, each $A^2$ is independently $SO_2$. In some embodiments, each $A^2$ is independently $SO_2$. In some embodiments, each $A^4$ is independently substituted or unsubstituted alkyl (e.g., propyl). In some embodiments, each $A^4$ is independently alkyl (e.g., propyl) substituted with one or more hydroxyl.

In some embodiments, A is

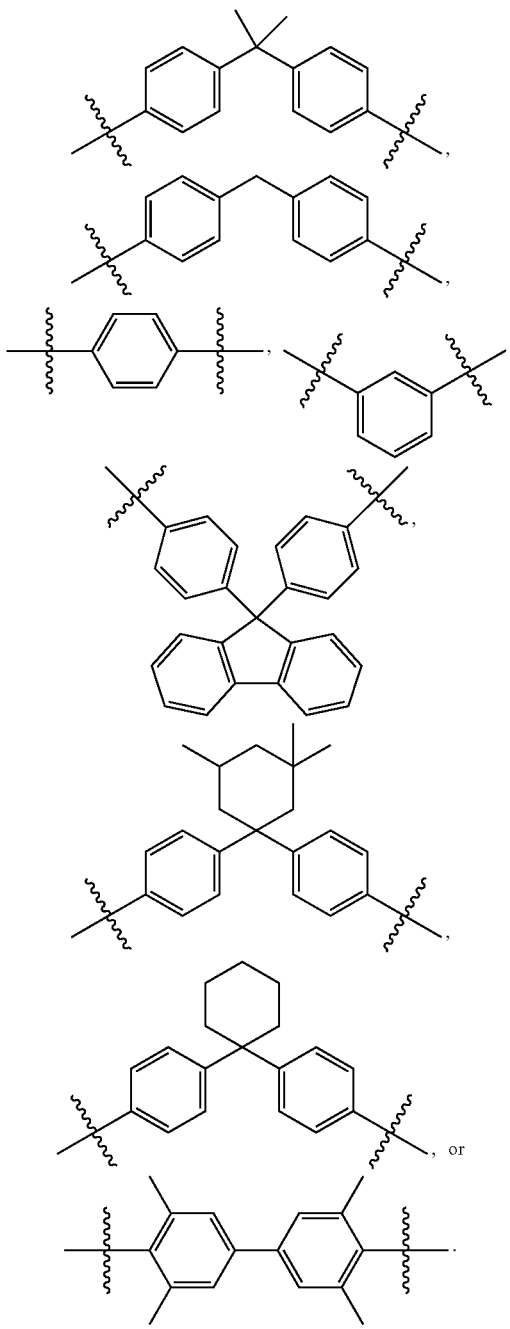

In some embodiments, each of A and D is independently represented by Formula (VI):

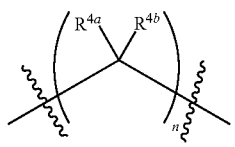

(VI)

wherein each of $R^{4A}$ and $R^{4B}$ is independently hydrogen, alkyl, or aryl, and n is 1 to 100 (e.g., 1 to 5, 1 to 10, 1 to 20, 1 to 50, or 1 to 90).

In some embodiments, each of $R^A$ and $R^C$ is independently represented by the Formula (III-a):

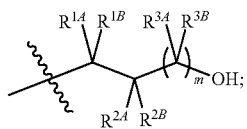

(III-a)

each of $R^{1A}$, $R^{1B}$, $R^{2A}$, $R^{2B}$, $R^{3A}$, and $R^{3B}$ is independently hydrogen, alkyl, or aryl; and m is an integer from 0 to 2.

In some embodiments, $R^A$ is a polyamine selected from methylene polyamines, ethylene polyamines, butylene polyamines, propylene polyamines, pentylene polyamines, hexylene polyamines, and heptylene polyamines. Examples of such polyamines include aliphatic polyamines such as trimethylene diamine, di(trimethylene)triamine, hexamethylene diamine, dihexamethylene triamine, diheptamethylene triamine. In some embodiments, $XR^A$ is derived from a secondary diamine such as piperazine. In some embodiments, $XR^A$ is piperazine.

In some embodiments, $R^A$ is derived from monoamino alcohols such as ethanolamine.

In some embodiments, the PHAE comprises at least one repeat unit of the Formula (II) wherein $R^A$ is an aliphatic polyamine and at least one repeat unit of the Formula (II) wherein $R^A$ is a different aliphatic polyamine. In some embodiments, the PHAE comprises a co-polymer of different Formula (II) repeat units.

In some embodiments, the PHAE comprises at least one repeat unit of the Formula (II):

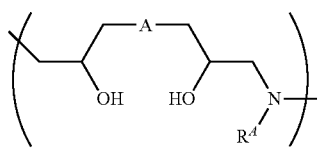

Formula (II)

wherein: A is alkylene, heteroalkylene, or arylene; and $R^A$ is alkyl, heteroalkyl, or aryl.

In some embodiments, $R^A$ is a polyamine selected from methylene polyamines, ethylene polyamines, butylene polyamines, propylene polyamines, pentylene polyamines, hexylene polyamines, and heptylene polyamines. Examples of such polyamines include aliphatic polyamines such as trimethylene diamine, di(trimethylene)triamine, hexamethylene diamine, dihexamethylene triamine, diheptamethylene triamine. In some embodiments, $XR^A$ is derived from a secondary diamine such as piperazine. In some embodiments, $XR^A$ is piperazine.

In some embodiments, $R^A$ is derived from monoamino alcohols such as ethanolamine.

In some embodiments, $R^A$ is represented by the Formula (III-a):

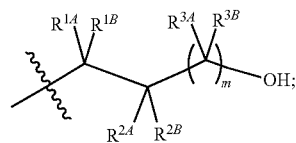

(III-a)

each of $R^{1A}$, $R^{1B}$, $R^{2A}$, $R^{2B}$, $R^{3A}$, and $R^{3B}$ is independently hydrogen, alkyl, or aryl; and m is an integer from 0 to 2.

In some embodiments, the PHAE comprises at least one repeat unit of the Formula (II) wherein $R^A$ is an aliphatic polyamine and at least one repeat unit of the Formula (II) wherein $R^A$ is a different aliphatic polyamine. In some embodiments, the PHAE comprises a co-polymer of different Formula (II) repeat units.

In some embodiments, the PHAE comprises at least one repeat unit of the Formula (III):

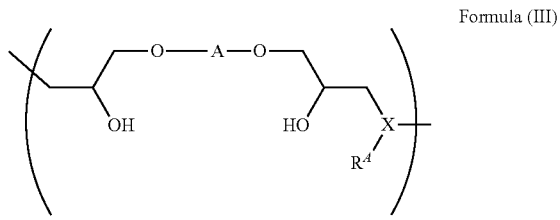

Formula (III)

wherein: A is an alkylene, heteroalkylene, arylene; X is N, and $R^A$ is an alkyl, heteroalkyl, or aryl.

In some embodiments, $R^A$ is a polyamine selected from methylene polyamines, ethylene polyamines, butylene polyamines, propylene polyamines, pentylene polyamines, hexylene polyamines, and heptylene polyamines. Examples of such polyamines include aliphatic polyamines such as trimethylene diamine, di(trimethylene)triamine, hexamethylene diamine, dihexamethylene triamine, diheptamethylene triamine. In some embodiments, $R^A$ is derived from a secondary diamine such as piperazine. In some embodiments, $R^A$ is piperazine.

In some embodiments, $R^A$ is derived from monoamino alcohols such as ethanolamine.

In some embodiments, $R^A$ is represented by the Formula (III-a):

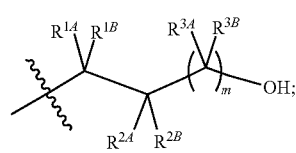

(III-a)

each of $R^{1A}$, $R^{1B}$, $R^{2A}$, $R^{2B}$, $R^{3A}$, and $R^{3B}$ is independently hydrogen, alkyl, or aryl; and m is an integer from 0 to 2.

In some embodiments, the PHAE comprises at least one repeat unit of the Formula (III) wherein $XR^A$ is an aliphatic polyamine and at least one repeat unit of the Formula (III) wherein $XR^A$ is a different aliphatic polyamine. In some embodiments, the PHAE comprises a co-polymer of different Formula (III) repeat units. Ester modified diepoxy resins provide a PHAE with a lower dissipation factor relative to non-esterfied resins.

In some embodiments, the PHAE comprises at least one repeat unit of the Formula (IV):

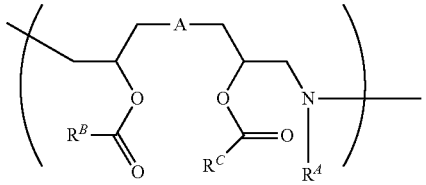

Formula (IV)

wherein: A is alkylene, heteroalkylene, or arylene; $R^A$ is an alkyl, heteroalkyl, or aryl, and each of $R^B$ and $R^C$ is independently alkyl or aryl.

In some embodiments, $R^A$ is a polyamine selected from methylene polyamines, ethylene polyamines, butylene polyamines, propylene polyamines, pentylene polyamines, hexylene polyamines, and heptylene polyamines. Examples of such polyamines include aliphatic polyamines such as trimethylene diamine, di(trimethylene)triamine, hexamethylene diamine, dihexamethylene triamine, diheptamethylene triamine. In some embodiments, $R^A$ is derived from a secondary diamine such as piperazine. In some embodiments, $R^A$ is piperazine.

In some embodiments, $R^A$ is derived from monoamino alcohols such as ethanolamine.

In some embodiments, $R^A$ is represented by the Formula (III-a):

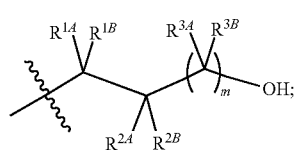

(III-a)

each of $R^{1A}$, $R^{1B}$, $R^{2A}$, $R^{2B}$, $R^{3A}$, and $R^{3B}$ is independently hydrogen, alkyl, or aryl; and m is an integer from 0 to 2.

In some embodiments, the PHAE comprises at least one repeat unit of the Formula (IV) wherein $R^A$ is an aliphatic polyamine and at least one repeat unit of the Formula (IV) wherein $R^A$ is a different aliphatic polyamine. In some embodiments, the PHAE comprises a co-polymer of different Formula (IV) repeat units.

In some embodiments, the PHAE comprises at least one repeat unit of the Formula (V):

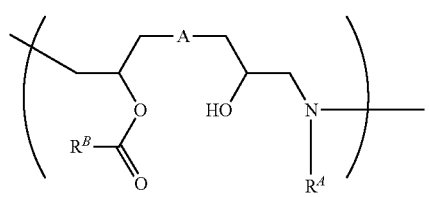

Formula (V)

wherein: A is an alkylene, heteroalkylene, or arylene; and $R^A$ is an alkyl, heteroalkyl, or aryl.

In some embodiments, $XR^A$ is a polyamine selected from methylene polyamines, ethylene polyamines, butylene polyamines, propylene polyamines, pentylene polyamines, hexylene polyamines, and heptylene polyamines. Examples of such polyamines include aliphatic polyamines such as trimethylene diamine, di(trimethylene)triamine, hexamethylene diamine, dihexamethylene triamine, diheptamethylene triamine. In some embodiments, $XR^A$ is derived from a secondary diamine such as piperazine. In some embodiments, $XR^A$ is piperazine.

In some embodiments, $R^A$ is derived from monoamino alcohols such as ethanolamine.

In some embodiments, $R^A$ is represented by the Formula (III-a):

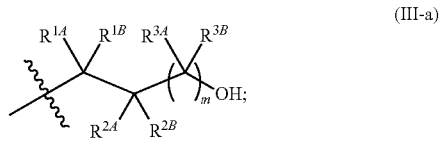

(III-a)

each of $R^{1A}$, $R^{1B}$, $R^{2A}$, $R^{2B}$, $R^{3A}$, and $R^{3B}$ is independently hydrogen, alkyl, or aryl; and m is an integer from 0 to 2.

In some embodiments, a PHAE described herein comprises at least one repeat unit of the Formula (V) wherein $R^A$ is an aliphatic polyamine and at least one repeat unit of the Formula (V) wherein $R^A$ is a different aliphatic polyamine. In some embodiments, the PHAE comprises a co-polymer of different Formula (V) repeat units.

In some embodiments, a PHAE described herein has an average molecular weight of greater than 5,000. In some embodiments, a PHAE described herein has an average molecular weight of greater than 30,000. In some embodiments, a PHAE described herein has an average molecular weight of greater than 40,000. In some embodiments, a PHAE described herein comprises has an average molecular weight of greater than 50,000. In some embodiments, a PHAE described herein comprises has an average molecular weight of greater than 60,000. In some embodiments, a PHAE described herein has an average molecular weight of greater than 70,000. In some embodiments, a PHAE described herein has an average molecular weight of greater than 80,000. In some embodiments, a PHAE described herein has an average molecular weight of greater than 90,000. In some embodiments, a PHAE described herein has an average molecular weight of greater than 100,000.

In some embodiments, $R^{1A}$, $R^{1B}$, $R^{2A}$, and $R^{2B}$ are not all hydrogen.

In some embodiments, $R^A$ is:

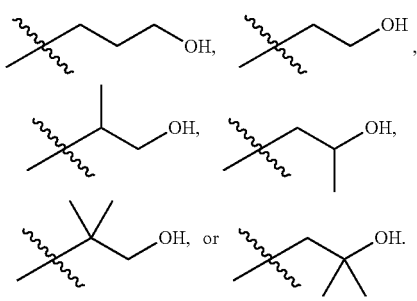

In some embodiments, $R^4$ is

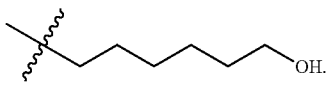 [SMILES: *CCCCCCO]

In some embodiments, at least one of $R^{1A}$, $R^{1B}$, $R^{2A}$, $R^{2B}$, $R^{3A}$, and $R^{3B}$ is an alkyl. In some embodiments, one of $R^{1A}$, $R^{1B}$, $R^{2A}$, $R^{2B}$, $R^{3A}$, and $R^{3B}$ is an alkyl. In some embodiments, one or two of $R^{1A}$, $R^{1B}$, $R^{2A}$, $R^{2B}$, $R^{3A}$, and $R^{3B}$ is an alkyl. In some embodiments, alkyl is optionally substituted alkyl.

In some embodiments, each of A and D is independently represented by Formula (VI):

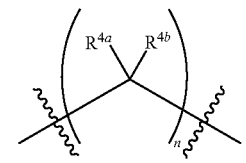

Formula (VI)

wherein each of $R^{4A}$ and $R^{4B}$ is independently hydrogen, alkyl, or aryl, and n is 1 to 100 (e.g., 1 to 5, 1 to 10, 1 to 20, 1 to 50, or 1 to 90).

In some embodiments, A is

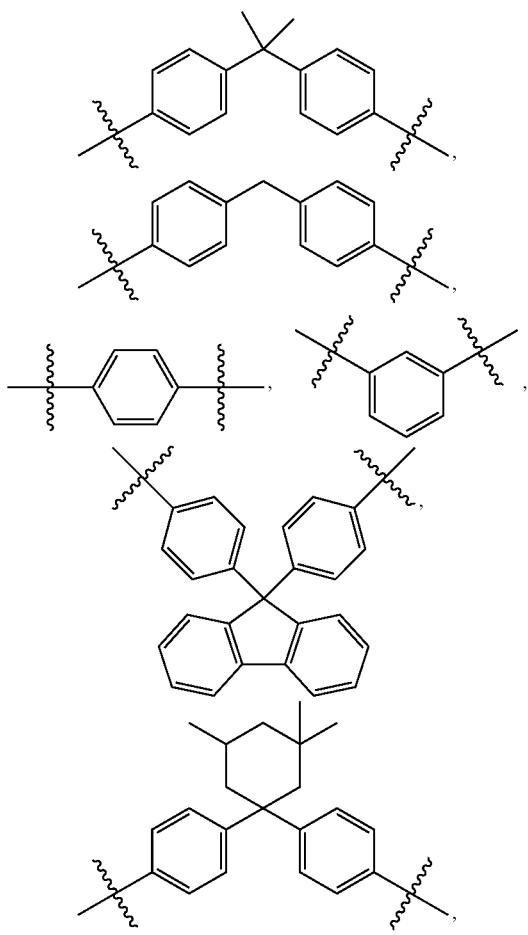

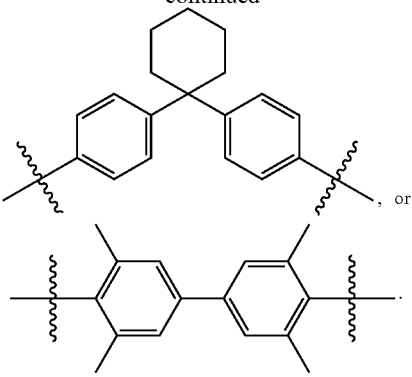

, or

In some embodiments, a PHAE described herein has a molecular weight that provides for ease in processability. For example, the compositions described herein have good melt processability. In some embodiments, a PHAE described herein has a molecular weight of at least 20,000 (e.g., at least 30,000, 40000, 50,000, 60,000, 70,000).

Component B—Crosslinking Agents

The polymer compositions described herein comprises a thermoplastic PHAE that is thermosetting or is already is crosslinked (e.g., crosslink derived from reaction or curing with a crosslinking agent). A thermoplastic that has been cross-linked no longer has the ability to melt or flow. An interesting characteristic of some crosslinked PHAEs is that even though they have lost their ability to melt or flow (relative to its non-crosslinked blend counterpart), it is possible for them to maintain the ability to bond to substrates and surfaces. This capability to bond without any flow is particularly useful in the manufacture of printed circuit boards, as it provides a means to provide easily achieved uniform dielectric spacing.

By definition, PHAE thermoplastics have a plurality of hydroxyl groups along the polymer backbone. Suitable crosslinking agents that can react with the hydroxyl group of the PHAE. Specific, but non-limiting, exemplary crosslinking agents for PHAE thermoplastics include di-functional and multi-functional anhydrides, epoxides, maleimides, acrylates, cyanate esters, isocyanates, blocked isocyanates and other hydroxyl-reactive compounds. Additionally, the hydroxyl groups of certain PHAE thermoplastic can be crosslinked by phosphorous-based compounds, for example, monomeric, dimeric, oligomeric, and polymeric phosphate compounds that contain at least two phosphonate ester moieties. Thus, the present disclosure is not particularly limited by the nature of the PHAE cross-linking agent, provided that the composition can be processed into a film or sheet after the PHAE is compounded with the crosslinking agent. For example, one method of preparing a film of the polymeric composition described herein is solvent casting, which involves compounding the components in a solvent as a varnish, and then casting the varnish to yield a film or sheet of the composition after solvent evaporation. If it is the case that the inherent reactivity between the PHAE and the crosslinking agent is too high, then the admixture will crosslink in the varnish, providing a gel, or something otherwise unusable for casting or other film formation processes. Thus, the present disclosure is not limited by the molecular class of the PHAE crosslinking agent, the inherent reactivity rate between the PHAE and the crosslinker must be considered.

To a degree, the amount and molecular nature of the cross-linking agent will influence certain used to adjust the mechanical and/or physical, and/or electrical properties of the composition. For example, the relative amount and nature of the crosslink agent will have an influence on factors such as the cure temperature, the bonding temperature, the bonding strength, the glass transition temperature, the thermal decomposition temperature, and the useful shelf-life of the film or sheet.

In some embodiments, a crosslinked PHAE described herein is formed by reaction of a PHAE and crosslinking agent in a molar ratio of 90:10, 80:20, 70:30, or 60:40

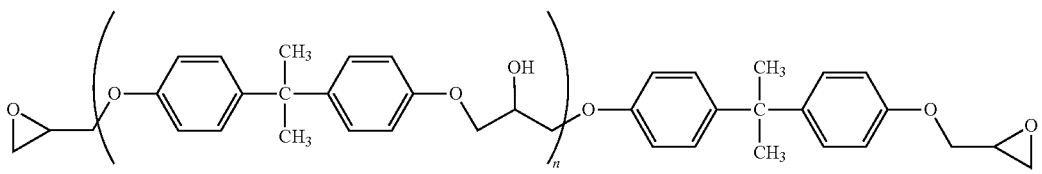

PHAE:crosslinking agent. In some embodiments, a cross-linked PHAE described herein is formed by reaction of a PHAE and crosslinking agent in a weight ratio of 90:5, 90:10, 80:20, 70:30, 60:40, 50:50 PHAE:crosslinking agent.

In some embodiments, a crosslinked PHAE described herein comprises about 1%, about 2%, about 3%, about 4%, about 5%, about 6%, about 7% about 8%, about 9%, or about 10% by weight of reacted crosslink (e.g., a reacted multifunctional epoxy resin) based on the total weight of the crosslinked PHAE.

In some embodiments, the cross-linking agent is an epoxy resin. The present disclosure is not limited by the exact nature of the epoxy resin. In some embodiments, the epoxy resin is a multifunctional epoxy resin (e.g., difunctional, trifunctional, or tetrafunctional). In some embodiments, the epoxy resin is a difunctional epoxy resin. In some embodiments, the difunctional epoxy resin is a diepoxide disclosed in US 2020/0317953, which is incorporated herein by reference.

In some embodiments, the epoxy resin is an aliphatic epoxy resin, a cycloaliphatic epoxy resin, or an aromatic epoxy resin. In some embodiments, the aliphatic epoxy resin is an epoxidized vegetable oil, epoxidized ether, or an epoxidized ester compound. In some embodiments, the cycloaliphatic epoxy resin is 3,4-epoxy cyclohexyl methyl-3',4' epoxycyclohexane carboxylate, 0-(3,4-epoxycyclohexyl)ethyltriethoxysilane, or vinyl cyclohexene diepoxide. In some embodiments, the aromatic epoxy resin is bisphenol A, bisphenol F, glycidyl ethers of phenolic novolacs and bisphenol A novolacs, or glycidyl or diglycidyl derivatives of aromatic amino compounds such as aminophenol and aniline.

In some embodiments, the epoxy resin is selected from the group consisting of glycidyl ether epoxy resin, glycidyl ester epoxy resin, glycidyl amine epoxy resin, alicyclic epoxy resin, aliphatic epoxy resin, and phenolic epoxy resin.

The epoxy crosslinking agent may be liquid, semi-solid, or solid at room temperature. For example, the glycidyl ethers of various phenolic compounds may be used, such as, but not limited to, a glycidyl ethers (e.g., diglycidyl ethers) derived from Bisphenol A, Bisphenol AP, Bisphenol AF, Bisphenol B, Bisphenol BP, Bisphenol C, Bisphenol G, Bisphenol M, Bisphenol P, Bisphenol PH, Bisphenol S, Bisphenol E, Bisphenol F, Bisphenol Z, or Bisphenol TMC, resorcinol derivatives, phenol novolac, DCPD novolacs, biphenyl-based resin, terphenyl-based resin. Additionally, non-phenolic epoxy resins may be employed as the cross-linking agent, such as, for example aliphatic and cycloaliphatic epoxy resins, and unsaturated epoxy resins.

In some embodiments, the crosslinking agent is a bisphenol diglycidyl ether, in which the bisphenol unit (—O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl.

In some embodiments, the crosslinking agent is a bisphenol A epoxy resin having the structure:

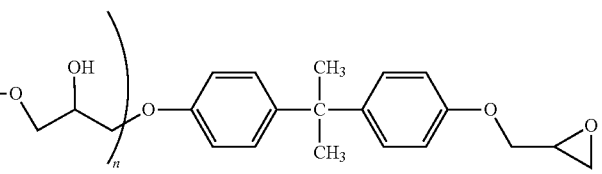

wherein n is 1 to 1,000 (e.g., 1, 1 to 10, 1 to 20, 1 to 30, 1 to 40, 1 to 50, 1 to 60, 1 to 70, 1 to 80, 1 to 90, 1 to 100, 1 to 200, or 1 to 500).

In some embodiments, the crosslinking agent is a flame retardant. In some embodiments, the crosslinking agent is an organophosphorus agent. In some embodiments, the organophosphorus agent reacts to form an organophosphorus cross-link. In some embodiments, the organophosphorous agent is a organophosphonate ester that contains one or more phosphonate ester groups. In some embodiments, the organophosphonate ester can be monomeric, dimeric, oligomeric, or polymeric. Specific, but non-limiting, examples of suitable phosphonate esters in include triphenyl phosphate and other triaryl phosphonates, resorcinol bis(diarylphosphonates), bisphenol A bis(diarylphosphonates); Phosphonate oligomers, homopolymers and co-polymers such as Nofia® OL series, CO series, and HM series of products available from FRX polymers (Chelmsford, Mass. USA).

In some embodiments, the crosslinking agent is a molecule or polymer that is capable of reacting with one or more hydroxyl groups. In some embodiments, the crosslinking agent is di-anhydride or poly-anhydride, such as a co-polymer of styrene and maleic anhydride. A specific, but non limiting example of poly-anhydrides include a co-polymer of styrene and maleic anhydride (SMA), A specific, but non limiting example of di-anhydrides include 4,4'-Oxydiphthalic anhydride, 3,3',4,4'-Benzophenonetetracarboxylic dianhydride, and hexafluoroisopropylidene-bis-phthalic dianhydride. In some embodiments the anhydride cross-linker is combined with a catalyst, such as for example, and imidazole catalyst to facilitate the crosslinking between the PHAE and the anhydride. In some embodiments, the crosslinking agent is cyanate ester resin. Specific, but non limiting examples of cyanate esters resin include the cyanate esters of bisphenol derivates, such as, A, E, F, M, and the cyanate esters of poly-phenolic compounds such as novolacs. In some embodiments, the crosslinking agent is a blocked isocyanate. In some embodiments, the crosslinking agent is a bis-malemide.

The amount of crosslinking agent in the admixture can be varied as a mechanism to modify the final properties of the crosslinked PHAE. The type and amount of crosslinker employed will have influence on the Tg and the adhesive properties, among other influences. In terms of the minimum amount of crosslinker required to induce thermosetting of the PHAE, only a small amount is required. In some embodiments, the crosslinking agent (e.g., an epoxy resin) is present in the composition at 1 to 50% by weight (w/w). In some preferred embodiments, the parts by weight ratio of PHAE to crosslinking agent (e.g., an epoxy resin) is from about 1:0.5 to about 1:1.2. In some even more preferred embodiments the parts by weight ratio of PHAE to crosslinking agent (e.g., an epoxy resin) is from about 1:0.2 to about 1:0.8.

A crosslinked PHAE described herein may comprise, in some embodiments, at least one of the repeat units of Formula (I), Formula (I-A), Formula (I-B), or Formula (I-C). Exemplary weight percentages of said repeat units of Formula (I), Formula (I-A), Formula (I-B), or Formula (I-C) include, but are not limited to, at least 10%, at least 20%, at least 30%, at least 40%, at least 50%, at least 60%, at least 70%, at least 80%, at least 90%, or at least 99% by weight of the repeat unit based on the total weight of the PHAE.

Fillers

The thermosetting polymer compositions described herein may comprise a filler, e.g., an inorganic filler (e.g., an inorganic filler based in silica). The incorporation of fillers into the thermosetting composition can be used to adjust the mechanical and/or physical, and/or electrical properties of the composition. For example, the thermal expansion coefficient of the thermoset composition described herein is reduced by using a filler, e.g., to decrease the probability of delamination for the laminated board and printed wiring board manufactured by the thermoset composition. The modulus of elasticity can also be increased by using a filler. The thermal conductivity can also be increased by using a filler Also, the dielectric constant can be modified by the incorporation of filler. For example, in certain applications it is desirable for the insulating bonding layer in a laminate to have a DK greater than 5, which may be achieved by the incorporation of a high DK filler such as $TiO_2$ (rutile) into the composition. Coordination with additive-type flame retardants can also protect dielectric properties of the composition from deterioration.

Inorganic fillers. Exemplary inorganic fillers include silicas such as natural silica, fused silica, amorphous silica, and hollow silica, white carbon, titanium white, rutile aerosol, alumina, talc, natural mica, synthetic mica, kaolin, clay, calcined clay, calcined kaolin, calcined talc. In some embodiments, the filler is a silica-based filler selected from a quartz or fused silica. In some embodiments, the filler is also a phosphorous flame retardant such as aluminum diethylphosphinate. In some embodiments, the filler is a metal hydrate such as aluminum hydroxide, aluminum oxide hydroxide or magnesium hydroxide. In some embodiments the filler is boehmite, molybdenum compounds such as molybdenum oxide and zinc molybdate, zinc borate, zinc stannate, barium sulfate, E-glass, A-glass, NE-glass, C-glass, L-glass, D-glass, S-glass, M-glass G20, quartz and hollow glass.

In some embodiments, the filler is selected from any one or mixture of at least two of aluminum hydroxide, magnesium hydroxide, kaolin, talcum, hydrotalcite, calcium silicate, beryllium oxide, boron nitride, glass powder, silica powder, zinc borate, aluminum nitride, silicon nitride, carborundum, magnesium oxide, zirconium oxide zirconium oxide, mullite, titanium oxide, potassium titanate, hollow glass micro-bead, potassium titanate fiber, carborundum single crystal filament, silicon nitride fibre, alumina single crystal fibre, staple glass fibre, polytetrafluorethylene powder, polyphenylene sulfide powder, or polystyrene powder. The mixture is for example mixture of aluminum hydroxide and magnesium hydroxide, mixture of kaolin hydrotalcite, mixture of calcium silicate and beryllium oxide, mixture of boron nitride and glass powder, mixture of and zinc borate, mixture of aluminum nitride and silicon nitride, mixture of carborundum and magnesium oxide, mixture of zirconium oxide and mullite, mixture of titanium oxide and potassium titanate, mixture of hollow glass microbead and potassium titanate single crystal filament, mixture of carborundum single crystal filament and silicon nitride single crystal filament, mixture of alumina single crystal filament and staple glass fibre, or mixture of polytetrafluorethylene powder and polyphenylene sulfide powder. The filler can be used alone, or be used after being mixed, and a notable synergic effect can be obtained by a mixing application.

In some embodiments, the filler is present in the composition at 0 to 80% by weight (w/w), e.g., the filler is present in the composition at 0 to 60% by weight (w/w). In some embodiments, the filler is present in the composition at about 0, 5, 10, 15, 20, 25, 30, 35, 40, 45, 50, 55, 60, 65, 70, 75, or 80% by weight (w/w).

In some embodiments, the filler is present in the composition at least about 0, 1, 5, 10, 15, 20, 25, 30, 35, 40, 45, 50, 55, 60, 65, 70, 75, or 80% w/w based on the total weight of the composition. In some embodiments, the filler is present in the composition at 0 to 80%, 1 to 70%, or 1 to 60% w/w based on the total weight of the composition.

In some embodiments, the filler comprises less than 80 wt % of the thermoset resin composition by mass.

In some embodiments, the average particle diameter of the inorganic filler is from about 0.1 to 10 micron.

Flame Retardants and/or Auxiliary Agents

There are many applications that require plastic/polymer systems that possess fire resistant or flame suppressant properties.

Flame retardants additives must be incorporated into many thermoplastic or polymers matrixes because they are not inherently flame resistant. Halogenated flame retardants have been found to be effective in many plastics. However, environmental and health concerns have caused halogenated flame retardants to be less desirable for electronic devices, and they are being increasingly regulated. A wide variety of flame retardants are known in the Art to be suitable for incorporation into a plastic and/or polymer compositions.

In some embodiments, the ratio of the PHAE to the crosslinking agent is about 1:0.02, 1:0.05, 1:0.1, 1:0.2, 1:0.4, 1:0.8, 1:1, 1:1.2.

In some embodiments, a polymer composition described herein comprise a flame retardant additive. In some embodiments, the flame retardant additive in the a composition described herein is halogenated, non-halogenated, phosphorous-based, inorganic, organic, hybrid inorganic organic, monomeric, oligomeric, and/or polymeric in nature. In some embodiments, a combination of one, or more than one, flame retardant mat be used. In some embodiments, the flame retardant is non-halogenated. In some embodiments, the non-halogenated flame retardant is a phosphorous-based and/or inorganic-based or a combination thereof. Specific, but non-limiting, examples of such inorganic-based flame retardants include aluminum trihydroxide, aluminum oxide hydroxide. Specific, but non-limiting, examples of such phosphorus-based flame retardants include melamine polyphosphate, aluminum diethyl phophinate, DOPO and DOPO derivatives including DOPO modified resins, Triaryl phosphonates (e.g., triphenyl phosphate (TPP)), dimeric aryl phosphates (e.g., resorcinol bis(diarylphosphonates), e.g., bisphenol A bis(diarylphosphonates) Phosphonate oligomers, homopolymers and co-polymers such as Nofia® OL series, CO series, and HM series of products available from FRX polymers (Chelmsford, Mass. USA). For particulate-based flame retardants particles that have an average size (diameter) of below 10 µm are preferred. In some embodiments, the choice and amount used of the flame retardant may be used to modify the mechanical and/or electrical and/or electrical properties of the PHAE polymer composition.

In some embodiments, the polymer composition is rated UL V-0 or UL VTM-0, wherein the polymer composition comprises a flame retardant. In some embodiments, the polymer composition is rated UL V-1 or UL VTM-1, wherein the polymer composition comprises a flame retardant. In some embodiments, the flame retardant is a non-halogenated flame retardant. In some embodiments, the non-halogenated flame retardant is a phosphorous-based flame retardant. In some embodiments, the flame retardant is a brominated flame retardant. In some embodiments, the brominated flame retardant additionally comprises a synergist (e.g., antimony trioxide, phosphorus-based flame retardant, or combination of antimony trioxide and phosphorus-based flame retardant). In some embodiments, a combination of different flame retardants is used. In some embodiments, the flame retardant is present in the composition at 0 to 80%, 1 to 70%, or 1 to 60% w/w based on the weight of the composition.

In some embodiments, the composition additionally comprises auxiliary agent as a property modifier such as, but not limited to, adhesion promoter, toughener, rubbering agent, or other polymer modifier. In some embodiments, the composition additionally comprises a catalyst to increase the rate of crosslinking (e.g., imidazole type catalyst).

In some embodiments, the auxiliary agent is selected from one or a combination of at least two of heat stabilizers, light stabilizers, ultra-violet light absorbers, anti-oxidants, anti-static agents, preservatives, adhesion promoters, toughening agents, rubber particles, fillers, pigments, dyes, lubricants, mold releasers, blowing agents, fungicides, plasticizers, processing aids, acid scavengers, dyes, pigments, stabilizers, blowing agents, nucleating agents, nanotubes, wetting agents, dispersing agents, synergists, mineral fillers, reinforcing agents, whiskers, inorganic fillers, other fire-retardant additives, smoke suppressants or mixtures thereof.

Layers, Films, and Sheets

The present disclosure also provides, in part, layers, films, and sheets that each comprise a polymer composition such as a polyhydroxyamino ether (e.g., a crosslinked polyhydroxyamino ether). In an embodiment, provided herein is a layer (e.g., a dielectric layer) comprising a polymer composition. In an embodiment, provided herein is a sheet or film (e.g., a dielectric sheet or film) comprising a polymer composition, the composition comprising a crosslinked polyhydroxy amino ether (PHAE). In another embodiment, provided herein is a sheet or film comprising a polymer composition, the composition comprising a crosslinked polyhydroxy amino ether (PHAE). n some embodiments, the film of the polymer compositions is dry and tack-free. In some embodiments, the crosslinked PHAE film has no ability to flow under temperature and pressure, but is still capable of bonding to substrate under temperature and pressure such as, for example, ½oz standard copper foil with a post-bonding peel strength in excess of 3 lb/in. In some embodiments, the crosslinked PHAE film has no flow, but is still capable of bonding to substrate such as ½ oz standard copper foil with a peel strength in excess of 6 lb/in. In some embodiments, the film or sheet has a thickness of greater than or equal to 1 micrometer. In some embodiments, the crosslinked PHAE film has thickness from about 0.25 mil to about 2.5 mil. In some embodiments, the crosslinked PHAE film has thickness from about 0.25 mil to about 2.5 mil, and with a thickness variance of about <10%. In some embodiments, the crosslinked PHAE film has thickness from about 0.25 mil to about 2.5 mil, and with a thickness variance of about <5%. In some embodiments, the film or sheet has a thickness of about 0.25 Mil to about 20.0 Mil. In some embodiments, the film or sheet has a thickness of greater than or equal to 1 micron. In some embodiments, individual film or sheets are stacked and pressed to achieve a thickness of about 10 Mil to about 125 Mil. In some embodiments, the film or sheet has a Young's modulus from about 1 GPa to about 4 GPa. In some embodiments, the film or sheet has a Young's modulus in excess of 4 GPa. In some embodiments, the film or sheet has a Young's modulus in excess of 10 GPa. In some embodiments, the film or sheet has isotropic coefficients of thermal expansion in the range of $15 \times 10^{-6}$ m/m to $60 \times 10^{-6}$ m/m in the X, Y, and the Z direction below the glass transition temperature. In some embodiments, the film or sheet has a dielectric constant of <3.5. In some embodiments, the film or sheet has a dielectric constant from about 2.9 to about 3.5 In some embodiments the film or the sheet has a Dielectric constant between 5.5 and 10.5. In some embodiments the film has a thermal conductivity >0.3 W/mK.

In an embodiment, described herein is a film comprising a crosslinked polyhydroxyamino ether, wherein the crosslinked polyhydroxyamino ether comprises a reaction product of: (a) a polyhydroxyamino ether comprising at least one repeat unit described herein; and (b) a crosslinking agent.

In some embodiments, the thickness of the film from about 0.1 Mil to about 6.0 Mil (e.g., about 0.1 to about 4.0 Mil, or about 0.1 to about 5.0 Mil). In some embodiments, the crosslinking agent is a epoxy resin. In some embodiments, the epoxy resin is a difunctional epoxy resin. In some embodiments, the epoxy resin is an aliphatic epoxy resin, a cycloaliphatic epoxy resin, or an aromatic epoxy resin. In some embodiments, the difunctional epoxy resin is an aromatic difunctional epoxy resin. In some embodiments, the epoxy resin is an epoxy resin derived from Bisphenol A, Bisphenol AP, Bisphenol, AF, Bisphenol B, Bisphenol BP, Bisphenol C, Bisphenol G, Bisphenol M, Bisphenol P, Bisphenol PH, Bisphenol S, Bisphenol E, Bisphenol F, Bisphenol Z, or Bisphenol TMC, resorcinol-based resin, phenol novolac glycidyl ether, DCPD novolac diglycidyl ether, a biphenyl-based resin, or a terphenyl-based resin. In some embodiments, the epoxy resin is Bisphenol A diglycidyl ether, Bisphenol S diglycidyl ether, Bisphenol E diglycidyl ether, Bisphenol F diglycidyl ether, Bisphenol Z diglycidyl ether, Bisphenol TMC diglycidyl ether, resorcinol-based diglycidyl ether, phenol novolac glycidyl ether, DCPD novolac diglycidyl ether, a biphenyl-based resin, or a terphenyl-based resin. In some embodiments, the crosslinking agent is an organophosphorus crosslinking agent. In some embodiments, the crosslinking agent is an anhydride crosslinking agent.

In some embodiments, the film further comprises a flame retardant additive. In some embodiments, the flame retardant additive is a non-halogenated flame retardant additive. In some embodiments, the non-halogenated flame retardant is selected from the group consisting of a phosphorous-based flame retardant additive, an inorganic-based flame-retardant additive, and a combination thereof. In some embodiments, the film further comprises an auxiliary agent selected from the group consisting of heat stabilizers, light stabilizers, ultra-violet light absorbers, anti-oxidants, anti-static agents, preservatives, adhesion promoters, toughening agents, rubber particles, pigments, dyes, lubricants, mold releasers, blowing agents, fungicides, plasticizers, processing aids, acid scavengers, dyes, pigments, stabilizers, blowing agents, nucleating agents, nanotubes, wetting agents, dispersing agents, synergists, mineral fillers, reinforcing agents, whiskers, inorganic fillers, smoke suppressants, and combinations thereof. In some embodiments, the film further comprises a filler. In some embodiments, the a filler is selected from the group consisting of aluminum hydroxide, magnesium hydroxide, kaolin, talcum, hydrotalcite, calcium silicate, beryllium oxide, boron nitride, glass powder, silica powder, zinc borate, aluminum nitride, silicon nitride, carborundum, magnesium oxide, zirconium oxide zirconium oxide, mullite, titanium oxide, potassium titanate, hollow glass micro-bead, potassium titanate fiber, carborundum single crystal filament, silicon nitride fiber, alumina single crystal fiber, staple glass fiber, polytetrafluorethylene powder, polyphenylene sulfide powder, polystyrene powder, and combinations thereof. In some embodiments, the polyhydroxyamino ether comprises at least at least 10 percent by weight, at least 20 percent by weight, at least 30 percent by weight, at least 40 percent by weight, at least 50 percent by weight, at least 60 percent by weight, at least 70 percent by weight, at least 80 percent by weight, at least 90 percent by weight, at least 95 percent by weight, or at least 99 percent by weight of the repeat unit based on the weight of the polyhydroxyamino ether. In some embodiments, the polyhydroxyamino ether comprises at least 50 percent by weight of the repeat unit based on the weight of the polyhydroxyamino ether. In some embodiments, the polyhydroxyamino ether comprises at least 90 percent by weight of the repeat unit based on the weight of the polyhydroxyamino ether.

In an embodiment, described herein is a film comprising a crosslinked polyhydroxyamino ether, wherein the crosslinked polyhydroxyamino ether comprises a reaction product of: (a) a polyhydroxyamino ether comprising at least one repeat unit of Formula (I):

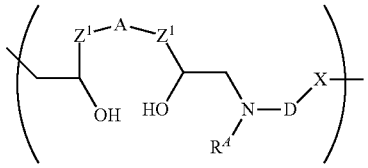

Formula (I)

wherein: A is substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, -$(A^1$-$A^2$-$A^3$-O-$A^4$-O$)_m$-$A^1$-$A^2$-$A^3$-, or -$A^1$-$A^2$-$A^3$-; each occurrence of $A^1$, $A^3$, and $A^4$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; each occurrence of $A^2$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, substituted or unsubstituted heteroarylene, or —$SO_2$—; D is absent, substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene (e.g., substituted or unsubstituted $C_{3-10}$ cycloalkylene), substituted or unsubstituted heterocyclylene (e.g., substituted or unsubstituted $C_{3-10}$ heterocyclylene), substituted or unsubstituted arylene, or substituted or unsubstituted heteroarylene; X is absent or $NR^B$; m is 1 to 1,000 (e.g., 1 to 2, 1 to 3, 1 to 4, 1 to 5, 1 to 6, 1 to 7, 1 to 8, 1 to 9, 1 to 10, 1 to 20, 1 to 30, 1 to 40, 1 to 50, 1 to 100, or 1 to 500); each of $Z^1$ and $Z^2$ is independently absent, O, $NR^C$, or S; and each of $R^A$, $R^B$, and $R^C$ is independently substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, or unsubstituted cycloalkylene (e.g., substituted or unsubstituted $C_{3-10}$ cycloalkyl), substituted or unsubstituted heterocyclylene (e.g., substituted or unsubstituted $C_{3-10}$ heterocyclyl), or substituted or unsubstituted aryl, or substituted or unsubstituted heteroaryl; and (b) a crosslinking agent, provided that when X is $NR^B$, D is not absent.

In some embodiments, the thickness of the film from about 0.1 Mil to about 6.0 Mil (e.g., about 0.1 to about 4.0 Mil, or about 0.1 to about 5.0 Mil). In some embodiments, the crosslinking agent is a epoxy resin. In some embodiments, the epoxy resin is a difunctional epoxy resin. In some embodiments, the epoxy resin is an aliphatic epoxy resin, a cycloaliphatic epoxy resin, or an aromatic epoxy resin. In some embodiments, the difunctional epoxy resin is an aromatic difunctional epoxy resin. In some embodiments, the epoxy resin is Bisphenol A diglycidyl ether, Bisphenol S diglycidyl ether, Bisphenol E diglycidyl ether, Bisphenol F diglycidyl ether, Bisphenol Z diglycidyl ether, Bisphenol TMC diglycidyl ether, resorcinol-based glycidyl ether, phenol novolac glycidyl ether, DCPD novolac glycidyl ether, a biphenyl-based resin, or a terphenyl-based resin. In some embodiments, the crosslinking agent is an organophosphorus crosslinking agent. In some embodiments, the crosslinking agent is an anhydride crosslinking agent. In some embodiments, $A^1$ and $A^3$ are substituted or unsubstituted phenylene. In some embodiments, $A^2$ are substituted or unsubstituted alkylene.

In some embodiments, $Z^1$ and $Z^2$ are O. In some embodiments, X and D are absent. In some embodiments, D is substituted or unsubstituted alkylene (e.g., substituted or unsubstituted $C_{1-20}$ alkylene or unsubstituted $C_{1-20}$ alkylene) or substituted or unsubstituted heteroalkylene (e.g., substituted or unsubstituted $C_{1-20}$ heteroalkylene, unsubstituted $C_{1-20}$ heteroalkylene). In some embodiments, when X is absent, D is not absent. In some embodiments, each of $R^A$, $R^B$, and $R^C$ is independently substituted or unsubstituted alkyl (e.g., substituted or unsubstituted $C_{1-20}$ alkyl, $C_{1-20}$ alkyl substituted with one or more independent occurrences of hydroxyl or amino, or unsubstituted $C_{1-20}$ alkyl). In some embodiments, A is substituted or unsubstituted phenylene, substituted or unsubstituted biphenylene. In some embodiments, each $A^1$ and $A^3$ is independently substituted or unsubstituted phenylene. In some embodiments, each $A^2$ is independently substituted or unsubstituted alkylene. In some embodiments, each $A^2$ is independently $SO_2$. In some embodiments, each $A^4$ is independently substituted or unsubstituted alkyl (e.g., propyl). In some embodiments, each $A^4$ is independently alkyl (e.g., propyl) substituted with one or more hydroxyl.

In some embodiments, A is,

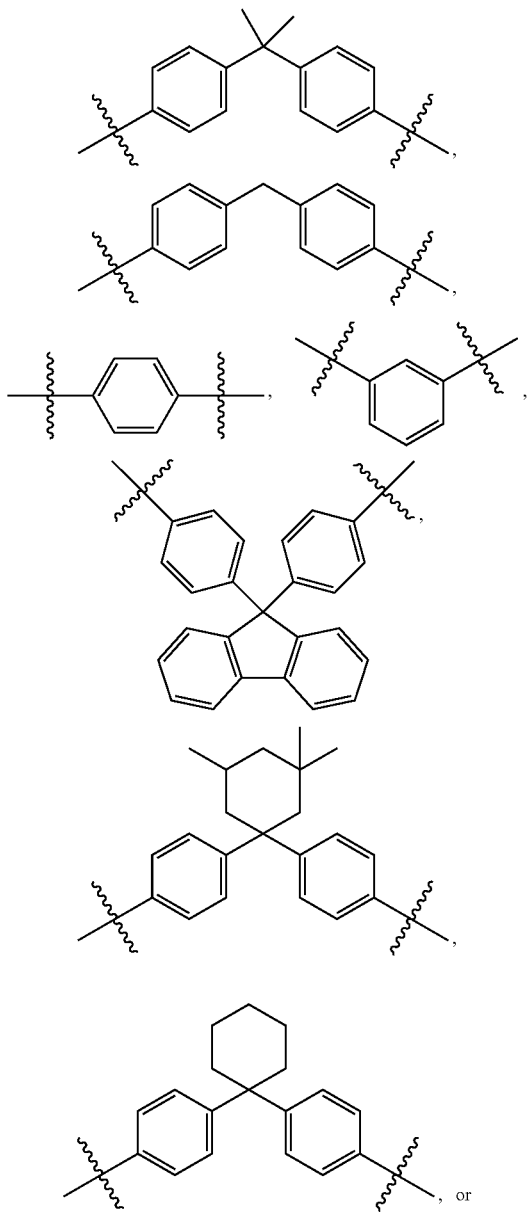

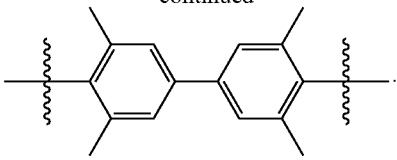

-continued

In some embodiments, the film further comprises a flame retardant additive. In some embodiments, the flame retardant additive is a non-halogenated flame retardant additive. In some embodiments, the non-halogenated flame retardant is selected from the group consisting of a phosphorous-based flame retardant additive, an inorganic-based flame-retardant additive, and a combination thereof. In some embodiments, the film further comprises an auxiliary agent selected from the group consisting of heat stabilizers, light stabilizers, ultra-violet light absorbers, anti-oxidants, anti-static agents, preservatives, adhesion promoters, toughening agents, rubber particles, pigments, dyes, lubricants, mold releasers, blowing agents, fungicides, plasticizers, processing aids, acid scavengers, dyes, pigments, stabilizers, blowing agents, nucleating agents, nanotubes, wetting agents, dispersing agents, synergists, mineral fillers, reinforcing agents, whiskers, inorganic fillers, smoke suppressants, and combinations thereof. In some embodiments, the film further comprises a filler. In some embodiments, the a filler is selected from the group consisting of aluminum hydroxide, magnesium hydroxide, kaolin, talcum, hydrotalcite, calcium silicate, beryllium oxide, boron nitride, glass powder, silica powder, zinc borate, aluminum nitride, silicon nitride, carborundum, magnesium oxide, zirconium oxide zirconium oxide, mullite, titanium oxide, potassium titanate, hollow glass micro-bead, potassium titanate fiber, carborundum single crystal filament, silicon nitride fiber, alumina single crystal fiber, staple glass fiber, polytetrafluorethylene powder, polyphenylene sulfide powder, polystyrene powder, and combinations thereof. In some embodiments, the polyhydroxyamino ether comprises at least at least 10 percent by weight, at least 20 percent by weight, at least 30 percent by weight, at least 40 percent by weight, at least 50 percent by weight, at least 60 percent by weight, at least 70 percent by weight, at least 80 percent by weight, at least 90 percent by weight, at least 95 percent by weight, or at least 99 percent by weight of the repeat unit of Formula (I) based on the weight of the polyhydroxyamino ether. In some embodiments, the polyhydroxyamino ether comprises at least 50 percent by weight of the repeat unit of Formula (I) based on the weight of the polyhydroxyamino ether. In some embodiments, the polyhydroxyamino ether comprises at least 90 percent by weight of the repeat unit of Formula (I) based on the weight of the polyhydroxyamino ether.

Also provided herein, in an embodiment, are metal clad and unclad films, sheets, and varnishes of polymer compositions for use, for example in the printed circuit board industry. The benefits include more isotropic properties, homogeneity, and ability to go reach dielectric thickness below 25 micrometers, improved dielectric spacing, enhancing adhesion to materials including metals such as copper, increased microvia reliability, toughening of the matrix and removal of the weave effect which plagues the woven fabric reinforced composites and causes skew or timing issues in high-speed digital transmission over printed circuit boards. High density interconnect boards that are used for IOT devises, camera modules, infotainment systems, mobile phones, tablets and other consumer devices in addition to chip packaging, standard double and single sided boards, motherboards, sequential lamination boards, high and standard layer count boards, flexible boards would greatly benefit from the use of this new technology. Further, Potential improvement in leasability and increased throughput due to absence of glass, ability to breaking the dielectric thickness barrier, a potential 20-30% thickness reduction in boards, weight reduction for printed circuit boards, capability to decrease stresses on copper plated vias, reduced Z expansion increasing microvia reliability, thickness control an improved crack resistance are some of the benefits expected from the technology. These metal clad or unclad films or sheets also help solve the differential skew problems due to their homogenous, isotropic properties in the film or non-reinforced form (no woven reinforcements).

In some embodiments, the sheet or film is provided on a carrier, or release, film, such as, but not limited to, PET, treated or surface modified PET, biaxially oriented polypropylene, and other common carrier or release liners. In some embodiments, the polymer compositions possess sufficient plasticity such that as films, they can be peeled off the carrier and placed on an object. In some embodiments, the composition on a carrier film can be placed on a substrate, passed through a laminator, and then the carrier film peeled away, leaving the polymer compositions on the new substrate. In some embodiments, the substrate to be laminated is a copper foil or sheet. In some embodiments, the substrate to be laminated is a coper clad (etched, partially etched, or no etch), or copper unclad fiberglass core. In some embodiments, the sheet or film is metal clad (e.g., copper) or unclad. In some embodiments, the sheet or film is unreinforced (e.g., not reinforced, not comprising woven or non-woven glass fabric, organic woven or non-woven fibers (e.g., micro or nano-sized inorganic or organic fillers)).

Method of Manufacturing a Film or Sheet

In an embodiment, provided herein is a sheet or film formed from a polymer composition, the composition comprising a polyhydroxy amino ether (PHAE) and a crosslinking agent. In another embodiment, provided herein is a film formed from a polymer composition, the composition comprising a cross-linked polyhydroxy amino ether (PHAE). The present disclosure provides methods of manufacturing said sheets and films from a polymer composition.

In some embodiments, methods of making sheets and films described herein include solvent casting, melt extrusion, lamination, and coating methods. Non-limiting examples of solvent casting, melt extrusion, lamination, and coating methods can be found, for example, in U.S. Patent Application Publication Nos. US 2009/0050842, US 2009/0054638, and US 2009/0096962, the contents of which are incorporated herein by reference. Further examples of solvent casting, melt extrusion, lamination, and coating methods to form films can be found, for example, in U.S. Pat. Nos. 4,592,885 and 7,172,713, and U.S. Patent Application Publication Nos. US 2005/0133953 and US 2010/0055356, the contents of which are incorporated herein by reference.

The continuous solvent cast process is the preferred method for providing thin films of the PHAE compositions described herein. The solvent casting process is capable of providing the compositions with extremely high quality and of uniform thickness. A typical solvent casting process involves 1) dissolving and/or dispersing the components (e.g., PHAE, crosslinker, filler, flame retardant, etc.) in a solvent to create a varnish; 2) coating the varnish on a substrate (e.g., copper foil) or casting film (e.g., PET); and 3) evaporation/removal of the solvent via drying (e.g., drying with a drying oven) to yield a film of the polymer composition on a substrate or carrier film. The final thickness of the film can be controlled, for example, by passing the varnish through a slot die. In order for the casting process to yield a high-quality film, it is important that the PHAE dissolves in the varnish solvent. The residence time and temperature profile of the drying oven will dictate factors such as the amount of residual solvent retained in the film and whether the film is a cross-linked PHAE composition or if it remains an admixture (e.g., has thermoplastic qualities). In some embodiments, the polymer composition is a thermoplastic polymer (or thermosetting) composition after the film casting and drying process. In some embodiments, the polymer composition is a crosslinked thermoplastic composition after the film casting and drying process.

In some embodiments, the PHAE composition is a film of a thickness between about 0.25 Mil and 2.5 Mil. In some embodiments, the PHAE composition is a film of a thickness between about 0.5 Mil and 2 Mil. In some embodiments, the PHAE composition is a film of a thickness of about 0.5 Mil. In some embodiments, the PHAE composition is a film of a thickness of about 1 Mil. In some embodiments, individual film or sheets are stacked and pressed to achieve a thickness of about 5 Mil to about 125 Mil. In some embodiments, the polymer film composition has a retained solvent percentage of less than 2 wt %. In some embodiments, the polymer film composition has a retained solvent percentage of less than 1 wt %. In some embodiments, the film or sheet has a Young's modulus from about 1 GPa to about 4 GPa. In some embodiments, the film or sheet has a Young's modulus in excess of 4 GPa. In some embodiments, the film or sheet has a Young's modulus in excess of 10 GPa. In some embodiments, the film or sheet has isotropic coefficients of thermal expansion in the range of $15\times10^{-6}$ m/m to $60\times10^{-6}$ m/m in the X, Y, and the Z direction below the glass transition temperature. In some embodiments, the film or sheet has a dielectric constant of <3.5. In some embodiments, the film or sheet has a dielectric constant from about 2.9 to about 3.3. In some embodiments the film or the sheet has a Dielectric constant between 5.5 and 10.5. In some embodiments the film has a thermal conductivity >0.3 W/mk.

In some embodiments, the sheet or film is provided on a carrier, or release, film, such as, but not limited to, PET, treated PET, biaxially oriented polypropylene, and other common carrier or release liners. In some embodiments the sheet or film is provided on a copper foil. In some embodiments, the film of the polymer composition is tack-free to the touch. In some embodiments, in some embodiments the polymer film composition possesses sufficient plasticity such that it can be peeled off the carrier film and placed on an object. In some embodiments, the composition on a carrier film can be placed on a substrate, passed through a roll laminator, and then the carrier film peeled away leaving the polymer composition on the new substrate. In some embodiments, the substrate to be laminated is a copper foil or sheet. In some embodiments, the substrate to be laminated is a coper clad (etched, partially etched, or no etch), or copper unclad fiberglass core. In some embodiments, the sheet or film is metal clad (e.g., copper) or unclad. In some embodiments, the sheet or film is unreinforced (e.g., not reinforced, not comprising woven or non-woven glass fabric, organic woven or non-woven).

In some embodiments, the PHAE composition is dispersed in a solvent and provide as a vanish composition. In some embodiments, the varnish composition is stable for days (e.g., before the varnish gels due to the crosslinking of the PHAE and the crosslinking agent). In some embodiments, the varnish composition is stable for weeks before gelling occurs. In some embodiments, the varnish composition is stable for months before gelling occurs. In some embodiments the varnish composition is casted on to a carrier film. In some embodiments, the carrier film is polyethylene terephthalate (PET) or PET that has been treated to further facilitate the release of the polymer composition. In some embodiments, the varnish composition is casted on to copper foil.

Printed Circuit Boards

In an embodiment, provided herein is a printed circuit board comprising one or more insulating layers (also referred to herein as a "dielectric layer" or "dielectric"), wherein the insulating layer comprises comprising a composition as described herein (e.g. a dielectric sheet or film comprising a crosslinked or non-crosslinked PHAE).

As used herein, "printed circuit board" refers to a mechanical support and electrically connected system of electronic components. For example, a printed circuit can be a primary insulating substrate (e.g., FR-4 glass epoxy) with a thin layer of copper foil lamination on one or both sides of the substrate. As used herein "printed circuit board component or part" refers to electronic components of the PBC, (e.g., electronic components connected through conductive tracks, pads, other features) and that may be etched from copper sheets laminated onto a non-conductive substrate. Advanced PCBs may include components embedded in the substrate (e.g., capacitors, resistors, or active devices). PCBs can be single sided (one copper layer), double sided (two copper layers) or multi-layer (e.g., multiple copper layer separated by dielectric materials) that allow high component density. Multilayer PCBs are complex composite structures typically comprising a series of layers of reinforced resin and copper foil. Conductors on different layers may be connected with "vias" or plated-through holes.

Laminates for PCB applications are manufactured via a process known as prepreging. As used herein, "laminate" refers to a composite comprising one or more plies of pre-preg, and may be optionally clad with metal (e.g., copper) foil on one or more sides, that is formed into a final product by the application of heat and pressure. A laminate as described herein may be cured or uncured. "Pre-preg" as used herein refers to a bonding layer of dielectric material which may or may not be reinforced. A PHAE composition as described herein, is used as prepreg for manufacturing the laminate. The thermoplastic polymer is used without any reinforcement fibrous reinforcement. A pre-preg is also commonly called a bonding sheet.

In one embodiment, described herein is a printed circuit board comprising at least one dielectric layer, wherein the dielectric layer comprises a crosslinked polyhydroxyamino ether. In some embodiments, the at least one dielectric layer comprises a film comprising the crosslinked polyhydroxyamino ether. In some embodiments, the at least one dielectric layer comprises at least at least 10% by weight, at least 20% by weight, at least 30% by weight, at least 40% by weight, at least 50% by weight, at least 60% by weight, at least 70% by weight, at least 80% by weight, at least 90% by weight, at least 95% by weight, or at least 99% by weight of the crosslinked polyhydroxyamino ether in an amount based on the total weight of the dielectric layer. In some embodiments, the at least one dielectric layer comprises at least 50% by weight of the crosslinked polyhydroxyamino ether based on the total weight of the dielectric layer. In some embodiments, the at least one dielectric layer comprises at least 50% by weight to at least 95% by weight of the crosslinked polyhydroxyamino ether in an amount based on the total weight of the dielectric layer. In some embodiments, the crosslinked polyhydroxyamino ether comprises the reaction product of a thermoplastic polyhydroxyamino ether and a epoxy resin. In some embodiments, the epoxy resin is a difunctional epoxy resin. the epoxy resin is an epoxy resin derived from Bisphenol A, Bisphenol AP, Bisphenol, AF, Bisphenol B, Bisphenol BP, Bisphenol C, Bisphenol G, Bisphenol M, Bisphenol P, Bisphenol PH, Bisphenol S, Bisphenol E, Bisphenol F, Bisphenol Z, or Bisphenol TMC, resorcinol-based resin, phenol novolac glycidyl ether, DCPD novolac diglycidyl ether, a biphenyl-based resin, or a terphenyl-based resin. In some embodiments, the epoxy resin is selected from the group consisting of Bisphenol A diglycidyl ether, Bisphenol S diglycidyl ether, Bisphenol E diglycidyl ether, Bisphenol F diglycidyl ether, Bisphenol Z diglycidyl ether, Bisphenol TMC diglycidyl ether, resorcinol derivatives, phenol novolac, DCPD novolacs, a biphenyl epoxy resin, and a terphenyl epoxy resin. In some embodiments, the at least one dielectric layer further comprises a filler. In some embodiments, the filler is selected from the group consisting of aluminum hydroxide, magnesium hydroxide, kaolin, talcum, hydrotalcite, calcium silicate, beryllium oxide, boron nitride, glass powder, silica powder, zinc borate, aluminum nitride, silicon nitride, carborundum, magnesium oxide, zirconium oxide zirconium oxide, mullite, titanium oxide, potassium titanate, hollow glass micro-bead, potassium titanate fiber, carborundum single crystal filament, silicon nitride fiber, alumina single crystal fiber, staple glass fiber, polytetrafluorethylene powder, polyphenylene sulfide powder, polystyrene powder, and combinations thereof. In some embodiments, the dielectric layer further comprises a flame retardant additive. In some embodiments, the flame retardant additive is a non-halogenated flame retardant additive. In some embodiments, the non-halogenated flame retardant is selected from the group consisting of a phosphorous-based flame retardant additive, an inorganic-based flame-retardant additive, and a combination thereof. In some embodiments, the at least one dielectric layer further comprises an auxiliary agent selected from the group consisting of heat stabilizers, light stabilizers, ultra-violet light absorbers, anti-oxidants, anti-static agents, preservatives, adhesion promoters, toughening agents, rubber particles, pigments, dyes, lubricants, mold releasers, blowing agents, fungicides, plasticizers, processing aids, acid scavengers, dyes, pigments, stabilizers, blowing agents, nucleating agents, nanotubes, wetting agents, dispersing agents, synergists, mineral fillers, reinforcing agents, whiskers, inorganic fillers, smoke suppressants, and combinations thereof. In some embodiments, the at least one dielectric layer further comprises one or more metal-filled microvias that penetrate the dielectric layer. In some embodiments, the average thickness of the at least one dielectric layer is about 0.1 Mil to about 6.0 Mil (e.g., about 0.1 Mil to about 4.0 Mil, or about 0.1 Mil to about 5.0 Mil). In some embodiments, the average thickness of the at least one dielectric layer is about about 0.25 Mil to about 2.5 Mil. In some embodiments, the average thickness of the at least one dielectric layer is about 0.5 Mil to about 2.0 Mil. In some embodiments, the average thickness of the at least one dielectric layer is about 0.5 Mil. In some embodiments, the average thickness of the at least one dielectric layer is about 1 Mil. In some embodiments, the average thickness of the at least one dielectric layer is about 5 Mil to about 125 Mil. In some embodiments, the printed circuit board is a high-density interconnect (HDI) board.

In some embodiments, the printed circuit board comprises a hybrid design, wherein the central core is a fiberglass-based dielectric (or laminate), and at least one, or a plurality, of the outer insulating layers comprise a PHAE dielectric film. In some embodiments, the printed circuit board is multilayered, double sided or single sided. In some embodiments, the sheet or film is used in a sequential build-up process. In some embodiments, the sheet or film is used in a sequential build-up process, where in the central core is fiberglass laminate.

PCB Fabrication Processes

In an embodiment, a typical procedure for forming laminates for printed circuit boards involve such operations as:

A. One or more sheets of prepreg are stacked or laid-up in alternating layers with one or more sheets of a conductive material, such as copper foil, if an electrical laminate is desired.

B. The laid-up sheets are pressed at elevated temperature and pressure for a time sufficient to fully bond the prepreg composition and form a laminate. The temperature of this lamination step is usually between 100° C. and 230° C. The lamination step is usually carried out for a time of from 1 minutes to 200 minutes, and most often between 10 minutes to 90 minutes. The lamination step may optionally be carried out at higher temperatures for shorter times (such as in continuous lamination processes) or for longer times at lower temperatures (such as in low energy press processes).

C. Optionally, the resulting laminate, for example, a copper-clad laminate, may be post-treated for a time at high temperature and ambient pressure. The temperature of post-treatment is usually between 120° C. and 250° C. The post-treatment usually is between 30 minutes and 12 hours.

In an embodiment, provided herein is a method of making or assembling a printed circuit board, comprising incorporation of a sheet or film as described herein. In some embodiments, said board is a high density interconnect board (HDI board). In some embodiments, said board is used for semiconductor chip packaging applications. In some embodiments, the sheet or film serves the purpose of eliminating skew between differential lines. In some embodiments, the sheet or film is placed below the top copper sheet to eliminate pad cratering during lead free assembly. In some embodiments, the sheet or film is used for filling heavy copper (>3 Ounce/Sft) layers. In some embodiments the film is used to enhance the thermal conductivity for applications in packaging LEDs or for other high-power devices and in general for improving thermal conductivity in printed circuit boards. In some embodiments, the sheet or film clad on both sides is used for embedded capacitance layers. In some embodiments, the sheet or film is used for embedding silicon or other interposer materials used in 2.5 D chip packaging applications or other embedded component packaging.

High Density Interconnect (HDI) PCB Fabrication Processes

In some embodiments, a printed circuit board is a high-density interconnect (HDI) printed circuit board. HDI printed circuit boards are different in the sense that they use build-up technology in which a board is sequentially built-up layer-by-layer as opposed to conventional multilayer processes which require significantly reduced number of process steps. HDI is widely used in applications that require smaller sized circuit boards. HDI printed circuit boards utilize the latest technology to reduce the area while increasing the functionality of printed circuit boards. The advancement is driven by miniaturization of components, driven by mobile computing, 4 G and 5G applications, avionics, and military applications. HDI applications materials require the use of thinner and thinner dielectric materials, with laser drilled microvias. There are three common HDI structures 1+n+1 which have one layer built up on either side of the assembly containing n layers. Typically, the lowest value of n is 2. i+n+i where i is greater than or equal to 2. This means build of i layers where i is greater than or equal to 2 on either side of a n layered assembly. In any layer HDI printed circuit boards the third variant, all layers can be interconnected using copper filled vias. These any-layer HDI printed circuit boards are commonly used in mobile devices.

In some embodiments, the printed circuit board is of the type 1+n+1, wherein the n layers can be a subassembly of multiple layers, in most cases the minimum value of n is 2 which means a double-sided core laminate. The 1 buildup layer on either side with these embodiments is made with the film comprising PHAE. In some embodiments, the printed circuit board is multilayered, double sided or single sided. In some embodiments, the sheet or film is used in a sequential build-up process. In some embodiments the printed circuit board is a high density interconnect (HDI) any layer HDI printed circuit board. In some embodiments, the high-density interconnect printed circuit board using buildup layers comprising of PHAE dielectric films is a i+n+i construction where i is greater than or equal to 2. In some embodiments, the buildup layers of the HDI 1+n+1 construction or i+n+i construction where i is greater than or equal to 2 use a PHAE dielectric film with a thickness of between 0.25 Mil and 4 mil. In some embodiments the buildup layers comprising of PHAE are used for any layer HDI boards and have a thickness between 0.25-4 Mils. In some embodiments, the buildup layers of the HDI 1+n+1 construction or i+n+i construction where i is greater than or equal to 2 or any layer HDI are fabricated with subtractive etching techniques. In some embodiments, the buildup layers of the HDI 1+n+1 construction or i+n+i construction where i is greater than or equal to 2 or any layer HDI are fabricated with modified semi additive (mSAP) or fully additive techniques. In some embodiments the build up layers comprised of PHAE dielectric films are sputtered with a thin layer of copper. In some embodiments the build up layers have a nano layer of copper on one side of their surface.

There are also other methods that are used to make prepregs and laminates for PCB applications, such as hot melt method where a B-staged epoxy is melted and pressed on to the reinforcement substrate.

Dielectric layers of PCBs may contain via holes. In some embodiments, the via holes may be filled with sheet or film by placing them directly over the area that requires the fill, including holes, gap between traces or to encapsulate the traces. This would include use in conjunction with copper (e.g., heavy copper), where resin filling by other means is difficult. The resin filling can be carried out across the entirety of the board or focused on only small areas.

In some embodiments, a thin layer (e.g., a very thin layer) of the PHAE composition is used between the metal (e.g., copper) and the thermoset or thermoplastic material to which the metal is to be bonded. In some embodiments, a thin layer (e.g., a very thin layer) of the PHAE composition between the top metal layer of a printed circuit board and the thermoset or thermoplastic material to which the metal is to be bonded.

Definitions

The articles "a" and "an" may be used herein to refer to one or to more than one (i.e. at least one) of the grammatical objects of the article. By way of example "an analogue" means one analogue or more than one analogue.

All ranges recited herein include the endpoints, including those that recite a range "between" two values.

As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

As used herein, "thermoplastic" or "thermoplastic polymer composition" is understood to mean a plastic material or polymer that becomes pliable or moldable above a specific temperature and solidifies upon cooling.

As used herein, "thermoset" or "thermosetting polymer composition" is understood to mean a polymer or resin in a soft solid or viscous state that changes irreversibly into an insoluble polymer network by curing and which, once hardened, cannot be reheated and melted back to a liquid form.

$T_g$ and glass transition temperature are used interchangeably herein.

Chemical Definitions

Definitions of specific functional groups and chemical terms are described in more detail below. The chemical elements are identified in accordance with the Periodic Table of the Elements, CAS version, *Handbook of Chemistry and Physics*, 75$^{th}$ Ed., inside cover, and specific functional groups are generally defined as described therein. Additionally, general principles of organic chemistry, as well as specific functional moieties and reactivity, are described in Thomas Sorrell, *Organic Chemistry*, University Science Books, Sausalito, 1999; Smith and March, *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3$^{rd}$ Edition, Cambridge University Press, Cambridge, 1987.

When a range of values is listed, it is intended to encompass each value and sub-range within the range. For example "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

"Aliphatic" refers to an alkyl, alkenyl, alkynyl, or carbocyclyl group, as defined herein.

"Alkyl" refers to a radical of a straight-chain or branched saturated hydrocarbon group having from 1 to 20 carbon atoms ("$C_{1-20}$ alkyl"). In some embodiments, an alkyl group has 1 to 12 carbon atoms ("$C_{1-12}$ alkyl"). In some embodiments, an alkyl group has 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl", also referred to herein as "lower alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), n-propyl ($C_3$), isopropyl ($C_3$), n-butyl ($C_4$), tert-butyl ($C_4$), sec-butyl ($C_4$), iso-butyl ($C_4$), n-pentyl ($C_5$), 3-pentanyl ($C_5$), amyl ($C_5$), neopentyl ($C_5$), 3-methyl-2-butanyl ($C_5$), tertiary amyl ($C_5$), and n-hexyl ($C_6$). Additional examples of alkyl groups include n-heptyl ($C_7$), n-octyl ($C_8$) and the like. Unless otherwise specified, each instance of an alkyl group is independently optionally substituted, i.e., unsubstituted (an "unsubstituted alkyl") or substituted (a "substituted alkyl") with one or more substituents; e.g., for instance from 1 to 5 substituents, 1 to 3 substituents, or 1 substituent. In certain embodiments, the alkyl group is unsubstituted $C_{1-10}$ alkyl (e.g., —$CH_3$). In certain embodiments, the alkyl group is substituted $C_{1-10}$ alkyl. Common alkyl abbreviations include Me (—$CH_3$), Et (—$CH_2CH_3$), iPr (—$CH(CH_3)_2$), nPr (—$CH_2CH_2CH_3$), n-Bu (—$CH_2CH_2CH_2CH_3$), or i-Bu (—$CH_2CH(CH_3)_2$).

As used herein, "alkylene," "alkenylene," and "alkynylene," refer to a divalent radical of an alkyl, alkenyl, and alkynyl group, respectively. When a range or number of carbons is provided for a particular "alkylene," "alkenylene," and "alkynylene" group, it is understood that the range or number refers to the range or number of carbons in the linear carbon divalent chain. "Alkylene," "alkenylene," and "alkynylene" groups may be substituted or unsubstituted with one or more substituents as described herein.

"Alkylene" refers to an alkyl group wherein two hydrogens are removed to provide a divalent radical, and which may be substituted or unsubstituted. Unsubstituted alkylene groups include, but are not limited to, methylene (—$CH_2$—), ethylene (—$CH_2CH_2$—), propylene (—$CH_2CH_2CH_2$—), butylene (—$CH_2CH_2CH_2CH_2$—), pentylene (—$CH_2CH_2CH_2CH_2CH_2$—), hexylene (—$CH_2CH_2CH_2CH_2CH_2CH_2$—), and the like. Exemplary substituted alkylene groups, e.g., substituted with one or more alkyl (methyl) groups, include but are not limited to, substituted methylene (—$CH(CH_3)$—, —$C(CH_3)_2$—), substituted ethylene (—$CH(CH_3)CH_2$—, —$CH_2CH(CH_3)$—, —$C(CH_3)_2CH_2$—, —$CH_2C(CH_3)_2$—), substituted propylene (—$CH(CH_3)CH_2CH_2$—, —$CH_2CH(CH_3)CH_2$—, —$CH_2CH_2CH(CH_3)$—, —$C(CH_3)_2CH_2CH_2$—, —$CH_2C(CH_3)_2CH_2$—, —$CH_2CH_2C(CH_3)_2$—), and the like.

"Alkenyl" refers to a radical of a straight-chain or branched hydrocarbon group having from 2 to 20 carbon atoms, one or more carbon-carbon double bonds (e.g., 1, 2, 3, or 4 carbon-carbon double bonds), and optionally one or more carbon-carbon triple bonds (e.g., 1, 2, 3, or 4 carbon-carbon triple bonds) ("$C_{2-20}$ alkenyl"). In certain embodiments, alkenyl does not contain any triple bonds. In some embodiments, an alkenyl group has 2 to 10 carbon atoms ("$C_{2-10}$ alkenyl"). In some embodiments, an alkenyl group has 2 to 9 carbon atoms ("$C_{2-9}$ alkenyl"). In some embodiments, an alkenyl group has 2 to 8 carbon atoms ("$C_{2-8}$ alkenyl"). In some embodiments, an alkenyl group has 2 to 7 carbon atoms ("$C_{2-7}$ alkenyl"). In some embodiments, an alkenyl group has 2 to 6 carbon atoms ("$C_{2-6}$ alkenyl"). In some embodiments, an alkenyl group has 2 to 5 carbon atoms ("$C_{2-5}$ alkenyl"). In some embodiments, an alkenyl group has 2 to 4 carbon atoms ("$C_{2-4}$ alkenyl"). In some embodiments, an alkenyl group has 2 to 3 carbon atoms ("$C_{2-3}$ alkenyl"). In some embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently optionally substituted, i.e., unsubstituted (an "unsubstituted alkenyl") or substituted (a "substituted alkenyl") with one or more substituents e.g., for instance from 1 to 5 substituents, 1 to 3 substituents, or 1 substituent. In certain embodiments, the alkenyl group is unsubstituted $C_{2-10}$ alkenyl. In certain embodiments, the alkenyl group is substituted $C_{2-10}$ alkenyl.

"Alkenylene" refers to an alkenyl group wherein two hydrogens are removed to provide a divalent radical, and which may be substituted or unsubstituted. Exemplary unsubstituted divalent alkenylene groups include, but are not limited to, ethenylene (—CH=CH—) and propenylene (e.g., —CH=CHCH$_2$—, —CH$_2$—CH=CH—). Exemplary substituted alkenylene groups, e.g., substituted with one or more alkyl (methyl) groups, include but are not limited to, substituted ethylene (—C(CH$_3$)=CH—, —CH=C (CH$_3$)—), substituted propylene (e.g., —C(CH$_3$) =CHCH$_2$—, —CH=C(CH$_3$)CH$_2$—, —CH=CHCH (CH$_3$)—, —CH=CHC(CH$_3$)$_2$—, —CH(CH$_3$)— CH=CH—, —C(CH$_3$)$_2$—CH=CH—, —CH$_2$—C(CH$_3$) =CH—, —CH$_2$—CH=C(CH$_3$)—), and the like.

"Alkynyl" refers to a radical of a straight-chain or branched hydrocarbon group having from 2 to 20 carbon atoms, one or more carbon-carbon triple bonds (e.g., 1, 2, 3, or 4 carbon-carbon triple bonds), and optionally one or more carbon-carbon double bonds (e.g., 1, 2, 3, or 4 carbon-carbon double bonds) ("$C_{2-20}$ alkynyl"). In certain embodiments, alkynyl does not contain any double bonds. In some embodiments, an alkynyl group has 2 to 10 carbon atoms ("$C_{2-10}$ alkynyl"). In some embodiments, an alkynyl group has 2 to 9 carbon atoms ("$C_{2-9}$ alkynyl"). In some embodiments, an alkynyl group has 2 to 8 carbon atoms ("$C_{2-8}$ alkynyl"). In some embodiments, an alkynyl group has 2 to 7 carbon atoms ("$C_{2-7}$ alkynyl"). In some embodiments, an alkynyl group has 2 to 6 carbon atoms ("$C_{2-6}$ alkynyl"). In some embodiments, an alkynyl group has 2 to 5 carbon atoms ("$C_{2-5}$ alkynyl"). In some embodiments, an alkynyl group has 2 to 4 carbon atoms ("$C_{2-4}$ alkynyl"). In some embodiments, an alkynyl group has 2 to 3 carbon atoms ("$C_{2-3}$ alkynyl"). In some embodiments, an alkynyl group has 2 carbon atoms ("$C_2$ alkynyl"). The one or more carbon-carbon triple bonds can be internal (such as in 2-butynyl) or terminal (such as in 1-butynyl). Examples of $C_{2-4}$ alkynyl groups include, without limitation, ethynyl ($C_2$), 1-propynyl ($C_3$), 2-propynyl ($C_3$), 1-butynyl ($C_4$), 2-butynyl ($C_4$), and the like. Examples of $C_{2-6}$ alkenyl groups include the aforementioned $C_{2-4}$ alkynyl groups as well as pentynyl ($C_5$), hexynyl ($C_6$), and the like. Additional examples of alkynyl include heptynyl ($C_7$), octynyl ($C_8$), and the like. Unless otherwise specified, each instance of an alkynyl group is independently optionally substituted, i.e., unsubstituted (an "unsubstituted alkynyl") or substituted (a "substituted alkynyl") with one or more substituents; e.g., for instance from 1 to 5 substituents, 1 to 3 substituents, or 1 substituent. In certain embodiments, the alkynyl group is unsubstituted $C_{2-10}$ alkynyl. In certain embodiments, the alkynyl group is substituted $C_{2-10}$ alkynyl.

"Alkynylene" refers to a linear alkynyl group wherein two hydrogens are removed to provide a divalent radical, and which may be substituted or unsubstituted. Exemplary divalent alkynylene groups include, but are not limited to, substituted or unsubstituted ethynylene, substituted or unsubstituted propynylene, and the like.

The term "heteroalkyl," as used herein, refers to an alkyl group, as defined herein, which further comprises 1 or more (e.g., 1, 2, 3, or 4) heteroatoms (e.g., oxygen, sulfur, nitrogen, boron, silicon, phosphorus) within the parent chain, wherein the one or more heteroatoms is inserted between adjacent carbon atoms within the parent carbon chain and/or one or more heteroatoms is inserted between a carbon atom and the parent molecule, i.e., between the point of attachment. In certain embodiments, a heteroalkyl group refers to a saturated group having from 1 to 10 carbon atoms and 1, 2, 3, or 4 heteroatoms ("heteroC$_{1-10}$ alkyl"). In some embodiments, a heteroalkyl group is a saturated group having 1 to 9 carbon atoms and 1, 2, 3, or 4 heteroatoms ("heteroC$_{1-9}$ alkyl"). In some embodiments, a heteroalkyl group is a saturated group having 1 to 8 carbon atoms and 1, 2, 3, or 4 heteroatoms ("heteroC$_{1-8}$ alkyl"). In some embodiments, a heteroalkyl group is a saturated group having 1 to 7 carbon atoms and 1, 2, 3, or 4 heteroatoms ("heteroC$_{1-7}$ alkyl"). In some embodiments, a heteroalkyl group is a group having 1 to 6 carbon atoms and 1, 2, or 3 heteroatoms ("heteroC$_{1-6}$ alkyl"). In some embodiments, a heteroalkyl group is a saturated group having 1 to 5 carbon atoms and 1 or 2 heteroatoms ("heteroC$_{1-5}$ alkyl"). In some embodiments, a heteroalkyl group is a saturated group having 1 to 4 carbon atoms and 1 or 2 heteroatoms ("heteroC$_{1-4}$ alkyl"). In some embodiments, a heteroalkyl group is a saturated group having 1 to 3 carbon atoms and 1 heteroatom ("heteroC$_{1-3}$ alkyl"). In some embodiments, a heteroalkyl group is a saturated group having 1 to 2 carbon atoms and 1 heteroatom ("heteroC$_{1-2}$ alkyl"). In some embodiments, a heteroalkyl group is a saturated group having 1 carbon atom and 1 heteroatom ("heteroC$_1$ alkyl"). In some embodiments, a heteroalkyl group is a saturated group having 2 to 6 carbon atoms and 1 or 2 heteroatoms ("heteroC$_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted heteroC$_{1-10}$ alkyl. In certain embodiments, the heteroalkyl group is a substituted heteroC$_{1-10}$ alkyl.

The term "heteroalkenyl," as used herein, refers to an alkenyl group, as defined herein, which further comprises one or more (e.g., 1, 2, 3, or 4) heteroatoms (e.g., oxygen, sulfur, nitrogen, boron, silicon, phosphorus) wherein the one or more heteroatoms is inserted between adjacent carbon atoms within the parent carbon chain and/or one or more heteroatoms is inserted between a carbon atom and the parent molecule, i.e., between the point of attachment. In certain embodiments, a heteroalkenyl group refers to a group having from 2 to 10 carbon atoms, at least one double bond, and 1, 2, 3, or 4 heteroatoms ("heteroC$_{2-10}$ alkenyl"). In some embodiments, a heteroalkenyl group has 2 to 9 carbon atoms at least one double bond, and 1, 2, 3, or 4 heteroatoms ("heteroC$_{2-9}$ alkenyl"). In some embodiments, a heteroalkenyl group has 2 to 8 carbon atoms, at least one double bond, and 1, 2, 3, or 4 heteroatoms ("heteroC$_{2-8}$ alkenyl"). In some embodiments, a heteroalkenyl group has 2 to 7 carbon atoms, at least one double bond, and 1, 2, 3, or 4 heteroatoms ("heteroC$_{2-7}$ alkenyl"). In some embodiments, a heteroalkenyl group has 2 to 6 carbon atoms, at least one double bond, and 1, 2, or 3 heteroatoms ("heteroC$_{2-6}$ alkenyl"). In some embodiments, a heteroalkenyl group has 2 to 5 carbon atoms, at least one double bond, and 1 or 2 heteroatoms ("heteroC$_{2-5}$ alkenyl"). In some embodiments, a heteroalkenyl group has 2 to 4 carbon atoms, at least one double bond, and 1 or 2 heteroatoms ("heteroC$_{2-4}$ alkenyl"). In some embodiments, a heteroalkenyl group has 2 to 3 carbon atoms, at least one double bond, and 1 heteroatom ("heteroC$_{2-3}$ alkenyl"). In some embodiments, a heteroalkenyl group has 2 to 6 carbon atoms, at least one double bond, and 1 or 2 heteroatoms ("heteroC$_{2-6}$ alkenyl"). Unless otherwise specified, each instance of a heteroalkenyl group is independently unsubstituted (an "unsubstituted heteroalkenyl") or substituted (a "substituted heteroalkenyl") with one or more substituents. In certain embodiments, the heteroalkenyl group is an unsubstituted heteroC$_{2-10}$ alkenyl. In certain embodiments, the heteroalkenyl group is a substituted heteroC$_{2-10}$ alkenyl.

The term "heteroalkynyl," as used herein, refers to an alkynyl group, as defined herein, which further comprises one or more (e.g., 1, 2, 3, or 4) heteroatoms (e.g., oxygen, sulfur, nitrogen, boron, silicon, phosphorus) wherein the one or more heteroatoms is inserted between adjacent carbon atoms within the parent carbon chain and/or one or more heteroatoms is inserted between a carbon atom and the parent molecule, i.e., between the point of attachment. In certain embodiments, a heteroalkynyl group refers to a group having from 2 to 10 carbon atoms, at least one triple bond, and 1, 2, 3, or 4 heteroatoms ("heteroC$_{2-10}$ alkynyl"). In some embodiments, a heteroalkynyl group has 2 to 9 carbon atoms, at least one triple bond, and 1, 2, 3, or 4 heteroatoms ("heteroC$_{2-9}$ alkynyl"). In some embodiments, a heteroalkynyl group has 2 to 8 carbon atoms, at least one triple bond, and 1, 2, 3, or 4 heteroatoms ("heteroC$_{2-8}$ alkynyl"). In some embodiments, a heteroalkynyl group has 2 to 7 carbon atoms, at least one triple bond, and 1, 2, 3, or 4 heteroatoms ("heteroC$_{2-7}$ alkynyl"). In some embodiments, a heteroalkynyl group has 2 to 6 carbon atoms, at least one triple bond, and 1, 2, or 3 heteroatoms ("heteroC$_{2-6}$ alkynyl"). In some embodiments, a heteroalkynyl group has 2 to 5 carbon atoms, at least one triple bond, and 1 or 2 heteroatoms ("heteroC$_{2-5}$ alkynyl"). In some embodiments, a heteroalkynyl group has 2 to 4 carbon atoms, at least one triple bond, and 1 or 2 heteroatoms ("heteroC$_{2-4}$ alkynyl"). In some embodiments, a heteroalkynyl group has 2 to 3 carbon atoms, at least one triple bond, and 1 heteroatom ("heteroC$_{2-3}$ alkynyl"). In some embodiments, a heteroalkynyl group has 2 to 6 carbon atoms, at least one triple bond, and 1 or 2 heteroatoms ("heteroC$_{2-6}$ alkynyl"). Unless otherwise specified, each instance of a heteroalkynyl group is independently unsubstituted (an "unsubstituted heteroalkynyl") or substituted (a "substituted heteroalkynyl") with one or more substituents. In certain embodiments, the heteroalkynyl group is an unsubstituted heteroC$_{2-10}$ alkynyl. In certain embodiments, the heteroalkynyl group is a substituted heteroC$_{2-10}$ alkynyl.

"Aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("C$_{6-14}$ aryl"). In some embodiments, an aryl group has six ring carbon atoms ("C$_6$ aryl"; e.g., phenyl). In some embodiments, an aryl group has ten ring carbon atoms ("C$_{10}$ aryl"; e.g., naphthyl such as 1-naphthyl and 2-naphthyl). In some embodiments, an aryl group has fourteen ring carbon atoms ("C$_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, and trinaphthalene. Particularly aryl groups include phenyl, naphthyl, indenyl, and tetrahydronaphthyl. Unless otherwise specified, each instance of an aryl group is independently optionally substituted, i.e., unsubstituted (an "unsubstituted aryl") or substituted (a "substituted aryl") with one or more substituents. In certain embodiments, the aryl group is unsubstituted C$_{6-14}$ aryl. In certain embodiments, the aryl group is substituted C$_{6-14}$ aryl.

"Heteroaryl" refers to a radical of a 5-10 membered monocyclic or bicyclic 4n+2 aromatic ring system (e.g., having 6 or 10 π electrons shared in a cyclic array) having ring carbon atoms and 1-4 ring heteroatoms provided in the aromatic ring system, wherein each heteroatom is independently selected from nitrogen, oxygen and sulfur ("5-10 membered heteroaryl"). In heteroaryl groups that contain one or more nitrogen atoms, the point of attachment can be a carbon or nitrogen atom, as valency permits. Heteroaryl bicyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused (aryl/heteroaryl) ring system. Bicyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

"Cycloalkyl" refers to a radical of a non-aromatic cyclic hydrocarbon group having from 3 to 10 ring carbon atoms ("C$_{3-10}$ cycloalkyl") and zero heteroatoms in the non-aromatic ring system. In some embodiments, a cycloalkyl group has 3 to 8 ring carbon atoms ("C$_{3-8}$ cycloalkyl"). In some embodiments, a cycloalkyl group has 3 to 6 ring carbon atoms ("C$_{3-6}$ cycloalkyl"). In some embodiments, a cycloalkyl group has 3 to 6 ring carbon atoms ("C$_{3-6}$ cycloalkyl"). In some embodiments, a cycloalkyl group has 5 to 10 ring carbon atoms ("C$_{5-10}$ cycloalkyl"). Exemplary C$_{3-6}$ cycloalkyl groups include, without limitation, cyclopropyl (C$_3$), cyclopropenyl (C$_3$), cyclobutyl (C$_4$), cyclobutenyl (C$_4$), cyclopentyl (C$_5$), cyclopentenyl (C$_5$), cyclohexyl (C$_6$), cyclohexenyl (C$_6$), cyclohexadienyl (C$_6$), and the like. Exemplary C$_{3-8}$ cycloalkyl groups include, without limitation, the aforementioned C$_{3-6}$ cycloalkyl groups as well as cycloheptyl (C$_7$), cycloheptenyl (C$_7$), cycloheptadienyl (C$_7$), cycloheptatrienyl (C$_7$), cyclooctyl (C$_8$), cyclooctenyl (C$_8$), bicyclo[2.2.1]heptanyl (C$_7$), bicyclo[2.2.2]octanyl (C$_8$), and the like. Exemplary C$_{3-10}$ cycloalkyl groups include, without limitation, the aforementioned C$_{3-8}$ cycloalkyl groups as well as cyclononyl (C$_9$), cyclononenyl (C$_9$), cyclodecyl (C$_{10}$), cyclodecenyl (C$_{10}$), octahydro-1H-indenyl (C$_9$), decahydronaphthalenyl (C$_{10}$), spiro[4.5]decanyl (C$_{10}$), and the like. As the foregoing examples illustrate, in certain embodiments, the cycloalkyl group is either monocyclic ("monocyclic cycloalkyl") or contain a fused, bridged or spiro ring system such as a bicyclic system ("bicyclic cycloalkyl") and can be saturated or can be partially unsaturated. "Cycloalkyl" also includes ring systems wherein the cycloalkyl ring, as defined above, is fused with one or more aryl or heteroaryl groups wherein the point of attachment is on the cycloalkyl ring, and in such instances, the number of carbons continue to designate the number of carbons in the carbocyclic ring system. Unless otherwise specified, each instance of a cycloalkyl group is independently optionally substituted, i.e., unsubstituted (an "unsubstituted cycloalkyl") or substituted (a "substituted cycloalkyl") with one or more substituents. In certain embodiments, the cycloalkyl group is unsubstituted $C_{3-10}$ cycloalkyl. In certain embodiments, the cycloalkyl group is a substituted $C_{3-10}$ cycloalkyl.

In some embodiments, "cycloalkyl" is a monocyclic, saturated cycloalkyl group having from 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 5 to 6 ring carbon atoms ("$C_{5-6}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_5$). Examples of $C_{3-6}$ cycloalkyl groups include the aforementioned $C_{5-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is unsubstituted $C_{3-10}$ cycloalkyl. In certain embodiments, the cycloalkyl group is substituted $C_{3-10}$ cycloalkyl.

"Heterocyclyl" or "heterocyclic" refers to a radical of a 3- to 10-membered non-aromatic ring system having ring carbon atoms and 1 to 4 ring heteroatoms, wherein each heteroatom is independently selected from nitrogen, oxygen, sulfur, boron, phosphorus, and silicon ("3-10 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or a fused, bridged or spiro ring system such as a bicyclic system ("bicyclic heterocyclyl"), and can be saturated or can be partially unsaturated. Heterocyclyl bicyclic ring systems can include one or more heteroatoms in one or both rings. "Heterocyclyl" also includes ring systems wherein the heterocyclyl ring, as defined above, is fused with one or more cycloalkyl groups wherein the point of attachment is either on the cycloalkyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently optionally substituted, i.e., unsubstituted (an "unsubstituted heterocyclyl") or substituted (a "substituted heterocyclyl") with one or more substituents. In certain embodiments, the heterocyclyl group is unsubstituted 3-10 membered heterocyclyl. In certain embodiments, the heterocyclyl group is substituted 3-10 membered heterocyclyl.

"Fused aryl" refers to an aryl having two of its ring carbon in common with a second aryl or heteroaryl ring or with a carbocyclyl or heterocyclyl ring.

As used herein, "alkylene," "alkenylene," "alkynylene," "heteroalkylene," "heteroalkenylene," "heteroalkynylene," "cycloalkylene," and "heterocylylene" refer to a divalent radical of an alkyl, alkenyl, alkynyl group, heteroalkyl, heteroalkenyl, heteroalkynyl, cycloalkyl, and heterocyclyl group respectively. When a range or number of carbons is provided for a particular "alkylene," "alkenylene," "alkynylene," "heteroalkylene," "heteroalkenylene," "heteroalkynylene," "cycloalkylene," and "heterocyclylene" group, it is understood that the range or number refers to the range or number of carbons in the linear carbon divalent chain. "Alkylene," "alkenylene," "alkynylene," "heteroalkylene," "heteroalkenylene," "heteroalkynylene," "cycloalkylene," and "heterocyclylene" groups may be substituted or unsubstituted with one or more substituents as described herein.

As used herein, "arylene" is a divalent radical of an aromatic group containing 5-12 ring atoms and can contain optional fused rings, which may be saturated, unsaturated, or aromatic. Examples of an arylene groups that are carbocylic include phenylene, naphthylene, biphenylene, phenanthrylene, and anthracylene. The term "heteroarylene" refers to an arylene containing 1-3 heteroatoms such as nitrogen, oxygen, or sulfur and can contain fused rings. Some examples of heteroarylene groups are pyridylene, furanylene, pyrrolylene, thienylene, thiazolylene, oxazolylene, imidazolylene, indolylene, benzofuranylene, and benzthiazolylene. The term "(hetero)arylene" refers to both arylene and heteroarylene.

"Amino" refers to the radical —$NH_2$.

"Hydroxy" refers to the radical —OH.

"Substituted amino" refers to an amino group of the formula —$N(R^{38})_2$ wherein $R^{38}$ is hydrogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, substituted or unsubstituted heteroaryl, or an amino protecting group, wherein at least one of $R^{38}$ is not a hydrogen. In certain embodiments, each $R^{38}$ is independently selected from hydrogen, $C_{1-8}$ alkyl, $C_{3-8}$ alkenyl, $C_{3-8}$ alkynyl, $C_{6-10}$ aryl, 5-10 membered heteroaryl, 4-10 membered heterocyclyl, or $C_{3-10}$ cycloalkyl; or $C_{1-8}$ alkyl, substituted with halo or hydroxy; $C_{3-8}$ alkenyl, substituted with halo or hydroxy; $C_{3-8}$ alkynyl, substituted with halo or hydroxy, or —$(CH_2)_t(C_{6-10}$ aryl), —$(CH_2)_t(5$-10 membered heteroaryl), —$(CH_2)_t(C_{3-10}$ cycloalkyl), or —$(CH_2)_t(4$-10 membered heterocyclyl), wherein t is an integer between 0 and 8, each of which is substituted by unsubstituted $C_{1-4}$ alkyl, halo, unsubstituted $C_{1-4}$ alkoxy, unsubstituted $C_{1-4}$ haloalkyl, unsubstituted $C_{1-4}$ hydroxyalkyl, or unsubstituted $C_{1-4}$ haloalkoxy or hydroxy; or both $R^{38}$ groups are joined to form an alkylene group.

Exemplary "substituted amino" groups include, but are not limited to, —$NR^{39}$—$C_{1-8}$ alkyl, —$NR^{39}$—$(CH_2)_t(C_6$-$C_{10}$ aryl), —$NR^{39}$—$(CH_2)_t(5$-10 membered heteroaryl), —$NR^{39}$—$(CH_2)_t(C_{3-10}$ cycloalkyl), and —$NR^{39}$—$(CH_2)_t(4$-10 membered heterocyclyl), wherein t is an integer from 0 to 4, for instance 1 or 2, each $R^{39}$ independently represents H or $C_{1-8}$ alkyl; and any alkyl groups present, may themselves be substituted by halo, substituted or unsubstituted amino, or hydroxy; and any aryl, heteroaryl, cycloalkyl, or heterocyclyl groups present, may themselves be substituted by unsubstituted $C_1$-$C_4$ alkyl, halo, unsubstituted $C_1$-$C_4$ alkoxy, unsubstituted $C_1$-$C_4$ haloalkyl, unsubstituted $C_1$-$C_4$ hydroxyalkyl, or unsubstituted $C_1$-$C_4$ haloalkoxy or hydroxy. For the avoidance of doubt the term 'substituted amino' includes the groups alkylamino, substituted alkylamino, alkylarylamino, substituted alkylarylamino, arylamino, substituted arylamino, dialkylamino, and substituted dialkylamino as defined below. Substituted amino encompasses both monosubstituted amino and disubstituted amino groups.

In general, the term "substituted", whether preceded by the term "optionally" or not, means that at least one hydrogen present on a group (e.g., a carbon or nitrogen atom) is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, any of the substituents described herein that results in the formation of a stable compound. For purposes of this invention, heteroatoms such as nitrogen may have hydrogen substituents and/or any suitable substituent as described herein which satisfy the valencies of the heteroatoms and results in the formation of a stable moiety.

As used herein, an epoxy resin described herein that contains 2 reactive epoxide groups is referred to as a "difunctional epoxy resin." As used herein, an epoxy resin described herein that contains reactive epoxide groups is referred to as a "trifunctional epoxy resin." As used herein, an epoxy resin described herein that contains reactive epoxide groups is referred to as a "tetrafunctional epoxy resin." Although not intending to be limited to specific epoxy resin structures, useful epoxy resins in accordance with the present disclosure include: bisphenol A epoxy resins; bisphenol F epoxy resins; phenol novolac epoxy resins; polycyclic epoxy resins, such as, dicyclopentadiene type epoxy resins; and, mixtures thereof. The epoxy resin may be a liquid, solid or mixture of both. Epoxy resins useful in the practice of the present disclosure are commercially available or can be made by techniques well known in the art.

As used herein, "PHAE" refers to polyhydroxyamino ether.

EXAMPLES

The present invention will be concretely described below with reference to the examples. However, it is not limited to these Examples.

In the following examples, the term "part(s)" in the following descriptions means "part(s) by mass". "PHAE" refers to polyhydroxyamino ether.

Example 1—PHAE Compositions and Crosslinked PHAE Compositions and their Properties Specific examples of PHAE compositions and some of their properties are given in Table 1. The compositions were obtained by either 1) compounding the components in a melt mixer apparatus (i.e., a solvent-free method); or 2) compounding in a solvent and uniformly dispersing in a high-speed rotary mixer to give a varnish; subsequently drawling down the varnish with a bar on top of a 2 mil PET film, and drying in the oven to a level of <1% retained solvent, to yield the composition as a film of a bout 1-2 mil thickness. The PHAE of used in the compositions is the reaction product of monoethanolamine and the diglycidyl ether of bisphenol, obtained via reactive extrusion with a average MW of about 30,000 as determined by gel permeation chromatography. The Component B crosslinkers SEV 3408 is a solid DCPD novolac epoxy resin manufactured by SHIN-A T&C (Korea). The Component B crosslinkers YDPN 638 (novolac epoxy resin) and YD 126SP (BPA epoxy resin) are manufactured by Aditya Birla Chemicals (Thailand) Ltd. The anhydride crosslinker SMA is styrene maleic anhydride manufactured by Polyscope Polymers BV (Europe). The crosslinker and phosphorous-based flame retardants TPP and DOPO were obtained from the M Chemical Company (USA). Fused silica is teco-sil-10 manufacture by Imerys Refractory Minerals (USA). The filler and phosphorus-based flame retardant MPP is Budit 361 manufactured by Chemische Fabrik Budenheim KG (Germany). The filler and flame retardant ATH is HT-1000 manufactured by The R. J. Marshall Company (USA). The filler and flame retardant AOH is Aprayl AOH 60 is manufactured by Nabaltec Ag (Germany). The filler and phosphorous-based flame retardant OP935 is Exolit® OP935 manufactured by Clariant (Europe). The thermally conductive filler BN is boron nitride Carbotherm® PCTP05 manufactured by Saint-Gobain (USA). The polymeric phosphonate flame retardant HM1100 is Nofia® HM1100 manufactured by FRX Polymers (USA). The auxiliary component adhesion promoter is Xiameter® OFS-6106 manufactured by DOW (USA). The reported DK (dielectric constant) values are at 5 GHz obtained with a split post dielectric resonator. The reported Tg values were obtained using a differential scanning calorimeter (DSC). The reported TD98 values were obtained according to the IPC-TM-650 2.4.24.6 test method. The reported CTE values were obtained according to the IPC-TM-650 2.4.24 test method. The reported Young's Modulus values were obtained using a dynamic mechanical analyzer instrument. The reported thermal conductivity values were obtained according to the laser flash method ASTM E1461.

TABLE 1

| | Components | Compound Amount (parts) | | | | | | | | | | | | | | |
|---|---|---|---|---|---|---|---|---|---|---|---|---|---|---|---|---|
| | | Ex1 | Ex2 | Ex3 | Ex4 | Ex5 | Ex6 | Ex7 | Ex8 | Ex9 | Ex10 | Ex11 | Ex12 | Ex13 | Ex14 | Ex15 |
| A | PHAE | 100 | 100 | 100 | 100 | 100 | 100 | 100 | 100 | 100 | 100 | 100 | 100 | 100 | 100 | 100 |
| B | SEV 3408 | | | | 5 | 30 | 30 | 30 | 30 | 40 | | | | | | |
| B | YDPN 638 | | | | | | | | | | 40 | 50 | | | | |
| B | YD 126SP | | | | | | | | | | | | 60 | 60 | 60 | 20 |
| B | SMA | | 4 | | | | | | | | | | | | | |
| B | TPP | | | | 14 | 20 | 20 | | | | | | | | 20 | |
| B/D | DOPO | 12 | 25 | 12 | | | | | | | | | | | | |
| B/D | Silica | | | 114 | | 172 | 149 | | | 100 | 150 | 150 | | | | |
| C | Rutile | | | | | | | | | | | | | | | 220 |

TABLE 1-continued

| Components | | Ex1 | Ex2 | Ex3 | Ex4 | Ex5 | Ex6 | Ex7 | Ex8 | Ex9 | Ex10 | Ex11 | Ex12 | Ex13 | Ex14 | Ex15 |
|---|---|---|---|---|---|---|---|---|---|---|---|---|---|---|---|---|
| C | BN | | | | | | | | | | | | | 120 | | |
| C/D | OP935 | | | | | | 40 | | | | 30 | 30 | 40 | 40 | | |
| C/D | ATH | | | | | | | 172 | 172 | | | | | | | |
| C/D | MPP | | | | | | | | | 60 | | | | | | |
| D | HM1100 | | | | | | 20 | | | | | | | | | |
| Aux | Xiameter | | | | | | | | | 1.5 | | | | | | |
| DK (@ 5 GHz) | | 3.0 | | 3.2 | | 3.3 | 3.3 | 3.7 | | | 3.2 | 3.2 | 3.2 | 3.7 | | 5.2 |
| Tg ° C. | | 136 | 133 | 140 | 159 | 93 | 92 | | | | 86 | 86 | 82 | | | |
| CTE (ppm below Tg) | | | | | | 34 | 33 | | | | | 40 | 47 | | | |
| CTE (ppm above Tg) | | | | | | 73 | 125 | | | | | 143 | 192 | | | |
| TD 98 (° C.) | | | | | | 340 | | 325 | | 322 | | 345 | 342 | | | |
| Modulus (GPa) | | | | | 9 | | 8 | | | | | | 2 | | | |
| TC (W/mK) | | | | | | | | | | | | | | 0.77 | | |

Example 2—Manufacture of High-Quality Dielectric PHAE Films

This example illustrative example corresponds to the PHAE composition according to Entry 1 in Table 1. The PHAE thermoplastic was dissolved in a 50:50 (wt/wt) mixture of dimethylformamide and methyl ethyl ketone to create 40 wt % varnish of the PHAE. The other components of the formulation were then compounded into the varnish and dispersed using a Cowles mixer. The viscosity of the PHAE varnish composition was 16,000 cps. The varnish composition was continuous applied by a die coater on a 24" wide, 2 mil PET carrier and passed through a four-zone drying oven. The line speed and the zone temperatures were adjusted such that the residual solvent level in the product was about 1% or less. The product was wound on a roll. This procedure was used to produce Films of the PHAE compositions with a thickness of 2.5 mil, 2 mil, 1 mil, and 0.5 Mil, wherein the thickness uniformity across the roll length and width was generally about ±5%. The PHAE film composition was tack-free to the touch and possessed sufficient plastic-like qualities such that it could be peeled of the PET.

This Example 2 is a select example, and this general procedure can be used to produce Films of many other PHAE Compositions.

Example 3—Manufacture of a Multi-Layered Printed Circuit Board Using PHAE Dielectric Films 4 layer 1+2+1 HDI boards were fabricated in via a sequential lamination process with the basic layer stack up details in FIG. 1. The PCB was built up from a 20 mil thick FR4 material (e.g., a fiberglass dielectric) using standard ½ oz copper foil was used. The panel size dimensions were 12"×18." The PHAE-based dielectric film used on the build-up layers was a Ex5 in Table 1. The film thickness was 1 mil. After the core material was etched with inner layer circuitry, 1 pile or 2 pile of 12×18" PHAE film were placed on each side of the core, and the complex laminated on both sides with copper in a press. The load temperature in the press was 120° F. The press was pressurized to 250 psi, and then was ramped to 420° F. at a rate of −18° F./min. The Press was held at 420° F. for 30 min, and then cooled to 120° F. before the pressure released. The 4 L hybrid laminate was then mechanically and laser drilled, the holes cleaned, the outer layer circuitry etched, and the plated and finished with a solder mask. The individual PCB boards were then routed out to yield the finished boards. The results of the basic analysis of both the 1 Mil and 2 Mil (e.g., 2 piles used) are provided in TABLE 2.

TABLE 2

| Coupon | Characteristic | 1 plie | 2 plie |
|---|---|---|---|
| Z | Dielectric spacing, (Mil) | 0.88/0.86 | 1.91/1.89 |
| Z | Permittivity @ 1 Ghz | 3.1 | 3.1 |
| Z | Loss tangent @ 1 GHz | 0.008 | 0.008 |
| E | Electric Strength (V/mil) | >1000 | >1000 |

This Example 3 is a select example, and a variety of other PHAE Film compositions may be used as build up layers to manufacture printed circuit boards.

Figure 2:
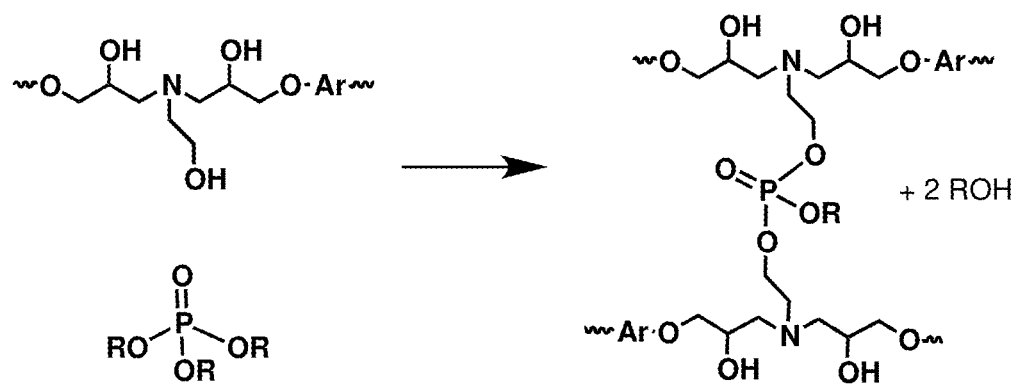
FIG. 2 shows a proposed mechanism for the conversion of PHAE admixture compositions into a crosslinked PHAE composition with a phosphonate crosslinker
Figure 3:
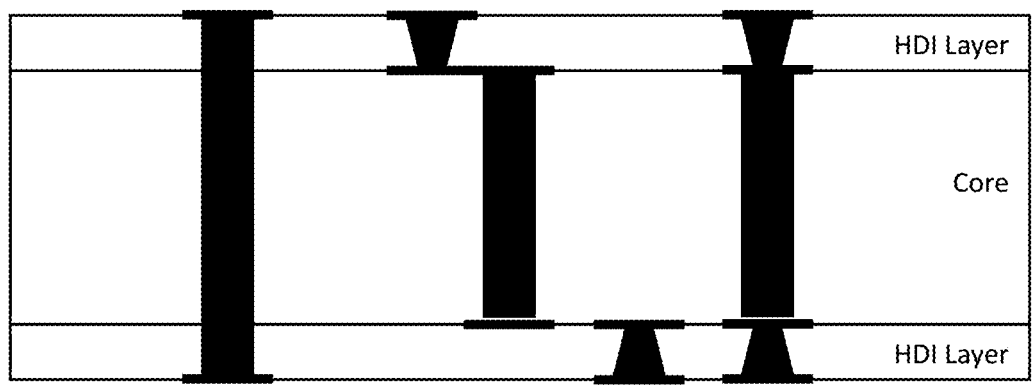
FIG. 3 shows a depiction of the general layer stack of the multilayered PCBs fabricated in Example 3 as described herein.
Figure 4:
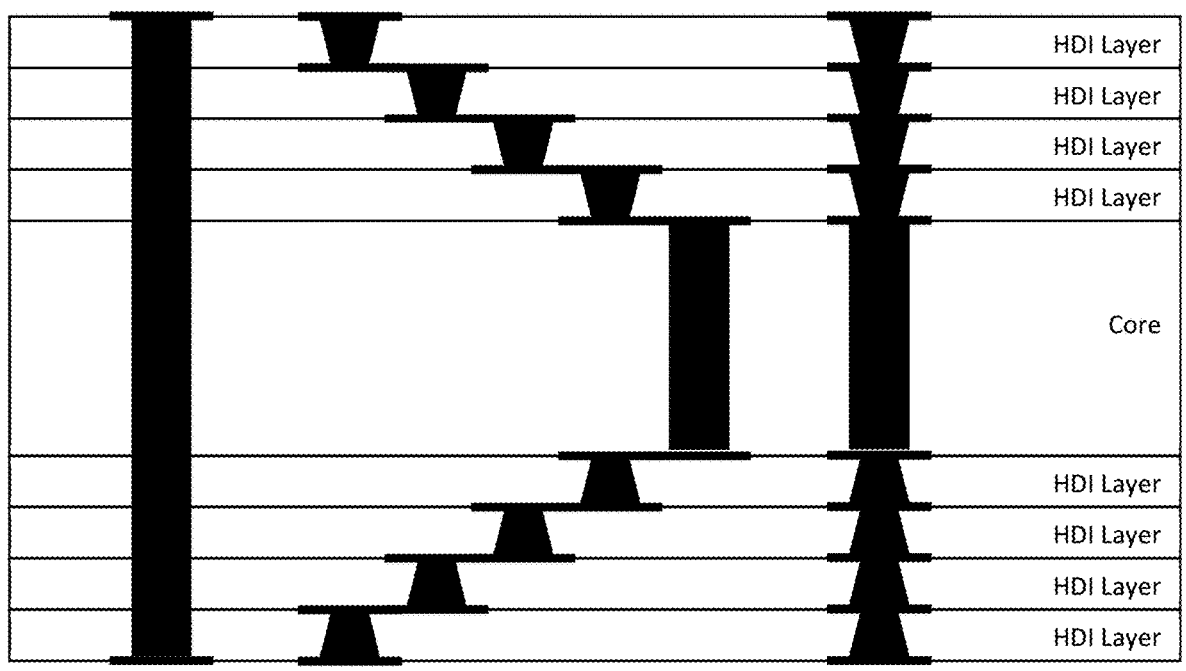
FIG. 4 shows a depiction of the general layer stack of the multilayered PCBs fabricated in Example 4 as described herein.

Example 4—Manufacture of a Multi-Layered Printed Circuit Board Using PHAE Dielectric Films 10 layer 4+2+4 HDI boards were fabricated in via a sequential lamination process with the basic layer stack up details in FIG. 2. The PCB was built up from a 20 mil thick FR4 material (e.g., a fiberglass dielectric) using standard ½ oz copper foil was used. The panel size dimensions were 12"×18." The PHAE-based dielectric film used on the build-up layers was a Ex5 in Table 1. The film thickness was 1 mil. The boards were fabricated in a similar manner as an Example 3, accept that 4 sequential laminations were performed (e.g., 8 total insulating layers comprising the PHAE dielectric film). Select data obtained from analysis of the finished 10 L PCBs is provide in TABLE 3.

TABLE 3

| Coupon | Characteristic | | Test method |
|---|---|---|---|
| Z | Impedance tolerance | <10% variance | Optical microsection |
| Z | Permittivity @ 1 Ghz | 3.1 | IPC-TM-650 2.5.5.9 |
| Z | Loss tangent @ 1 GHz | 0.008 | IPC-TM-650 2.5.5.9 |
| D | Thermal Stress (6X 260° C.) | Pass (visual) | IPC-TM-650 2.6.8 |
| E | Electric Strength (V/mil) | 3180 | IPC-TM-650 2.5.7D |

TABLE 3-continued

| Coupon | Characteristic | | Test method |
|---|---|---|---|
| N | Peel strength | 4.2 lb/in | IPC-TM-650 2.4.8 |
| N | Peel strength (after thermal stress) | 3.9 lb/in | IPC-TM-650 2.4.8 |
| IPC-9255 | CAF Resistance (85° C., 85% R/H) | Pass | — |

EQUIVALENTS

Those skilled in the art will recognize, or be able to ascertain, using no more than routine experimentation, numerous equivalents to the specific embodiments described specifically herein. Such equivalents are intended to be encompassed in the scope of the following claims.

What is claimed is:

1. A film-making process comprising:
preparing a film comprising a crosslinked polyhydroxyamino ether and at least one of a flame retardant and a filler using a method selected from the group consisting of a solvent casting method, a melt extrusion method, a lamination method, and a coating method, wherein the crosslinked polyhydroxyamino ether comprises a reaction product of a crosslinking agent and a polyhydroxyamino ether comprising at least one repeat unit of formula (I):

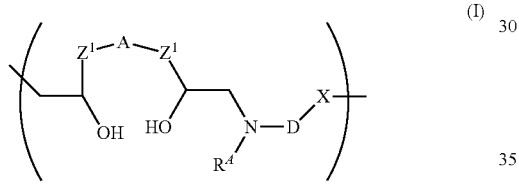

where
A is substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene, substituted or unsubstituted heterocyclylene, substituted or unsubstituted arylene, substituted or unsubstituted heteroarylene, $-(A^1-A^2-A^3-O-A^4-O)_m-A^1-A^2-A^3-$, or $-A^1-A^2-A^3-$;
each occurrence of $A^1$, $A^3$, and $A^4$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene, substituted or unsubstituted heterocyclylene, substituted or unsubstituted arylene, or substituted or unsubstituted heteroarylene;
each occurrence of $A^2$ is independently substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene, substituted or unsubstituted heterocyclylene, substituted or unsubstituted arylene, substituted or unsubstituted heteroarylene, or $-SO_2-$;
D is absent, substituted or unsubstituted alkylene, substituted or unsubstituted alkenylene, substituted or unsubstituted alkynylene, substituted or unsubstituted heteroalkylene, substituted or unsubstituted heteroalkenylene, substituted or unsubstituted heteroalkynylene, substituted or unsubstituted cycloalkylene, substituted or unsubstituted heterocyclylene, substituted or unsubstituted arylene, or substituted or unsubstituted heteroarylene;
X is absent or $NR^B$, provided that when X is $NR^B$, D is not absent;
m is 1 to 1,000;
$Z^1$ is absent, O, $NR^C$, or S; and
each of $R^A$, $R^B$, and $R^C$ is independently substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted cycloalkyl, substituted or unsubstituted heterocyclyl, or substituted or unsubstituted aryl, or substituted or unsubstituted heteroaryl.

2. The process of claim 1, wherein
the film is formed on a carrier film and
the film is transferrable from the carrier film to a substrate.

3. The process of claim 1, wherein the film is prepared using a solvent casting method comprising:
(i) dissolving and/or dispersing the crosslinking agent, the polyhydroxyamino ether, and at least one of the flame retardant and the filler in a solvent to create a varnish;
(ii) coating the varnish on a substrate or carrier film via a casting process; and
(iii) removing the solvent to obtain the film on the substrate or the carrier film.

4. The process of claim 1, wherein the crosslinking agent is an epoxy resin.

5. The process of claim 4, wherein the epoxy resin is an aliphatic epoxy resin, a cycloaliphatic epoxy resin, or an aromatic epoxy resin.

6. The process of claim 4, wherein the epoxy resin is Bisphenol A glycidyl ether, Bisphenol S glycidyl ether, Bisphenol E glycidyl ether, Bisphenol F glycidyl ether, Bisphenol Z glycidyl ether, Bisphenol TMC glycidyl ether, resorcinol-based glycidyl ether, phenol novolac glycidyl ether, DCPD novolac glycidyl ether, a biphenyl-based resin, or a terphenyl-based resin.

7. The process of claim 4, wherein the epoxy resin is a difunctional epoxy resin.

8. The process of claim 7, wherein the difunctional epoxy resin is an aromatic difunctional epoxy resin.

9. The process of claim 1, wherein the crosslinking agent is an organophosphorus crosslinking agent.

10. The process of claim 1, wherein the crosslinking agent is an anhydride crosslinking agent.

11. The process of claim 1, wherein $Z^1$ in the formula (I) is O.

12. The process of claim 1, wherein X and D in the formula (I) are absent.

13. The process of claim 1, wherein D in the formula (I) is substituted or unsubstituted alkylene or substituted or unsubstituted heteroalkylene.

14. The process of claim 1, wherein, in the formula (I), when X is absent, D is not absent.

15. The process of claim 1, wherein each of $R^A$, $R^B$, and $R^C$ in the formula (I) is independently substituted or unsubstituted alkyl.

16. The process of claim 1, wherein A in the formula (I) is

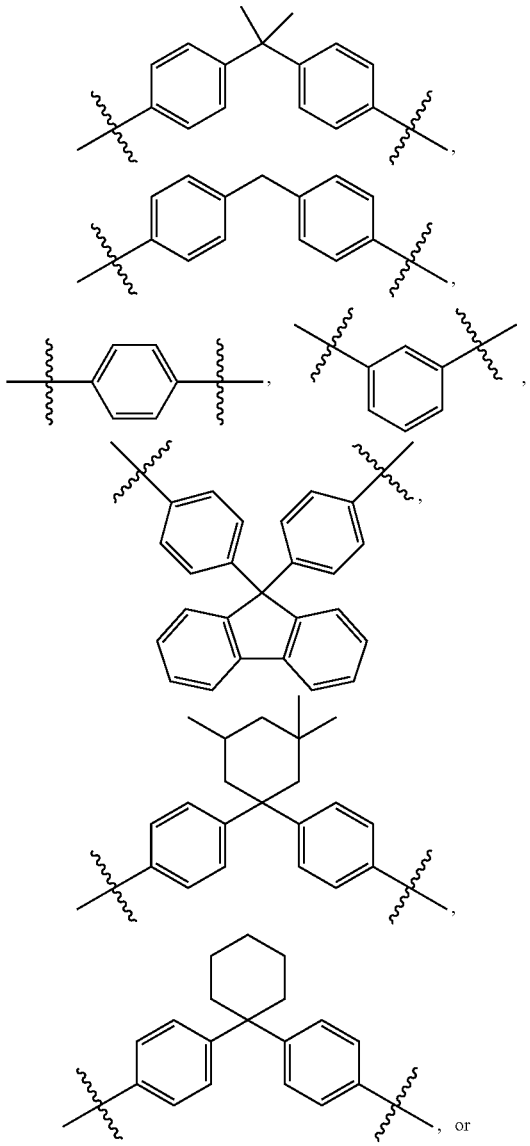

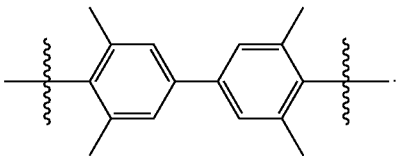

17. The process of claim 1, wherein the film comprises the flame retardant.

18. The process of claim 17, wherein the flame retardant is a non-halogenated flame retardant.

19. The process of claim 18, wherein the non-halogenated flame retardant is selected from the group consisting of a phosphorous-based flame retardant, an inorganic-based flame-retardant, and a combination thereof.

20. The process of claim 1, wherein the film comprises the filler.

21. The process of claim 20, wherein the filler is selected from the group consisting of aluminum hydroxide, magnesium hydroxide, kaolin, talcum, hydrotalcite, calcium silicate, beryllium oxide, boron nitride, glass powder, silica powder, zinc borate, aluminum nitride, silicon nitride, carborundum, magnesium oxide, zirconium oxide zirconium oxide, mullite, titanium oxide, potassium titanate, hollow glass micro-bead, potassium titanate fiber, carborundum single crystal filament, silicon nitride fiber, alumina single crystal fiber, staple glass fiber, polytetrafluorethylene powder, polyphenylene sulfide powder, polystyrene powder, and a combination thereof.

22. The process of claim 1, wherein the film further comprises an auxiliary agent selected from the group consisting of a heat stabilizer, a light stabilizer, an ultra-violet light absorber, an anti-oxidant, an anti-static agent, a preservative, an adhesion promoter, a toughening agent, a rubber particle, a pigment, a dye, a lubricant, a mold releaser, a blowing agent, a fungicide, a plasticizer, a processing aid, an acid scavenger, a nucleating agent, a nanotube, a wetting agent, a dispersing agent, a synergist, a reinforcing agent, a whisker, a smoke suppressant, and a combination thereof.

23. The process of claim 1, wherein the polyhydroxyamino ether comprises at least 50 percent by weight of the repeat unit of formula (I) based on a total weight of the polyhydroxyamino ether.

24. The process of claim 1, wherein the polyhydroxyamino ether comprises at least 90 percent by weight of the repeat unit of formula (I) based on a total weight of the polyhydroxyamino ether.

* * * * *